United States Patent
Anno et al.

(10) Patent No.: US 7,777,907 B2
(45) Date of Patent: Aug. 17, 2010

(54) PRINTING SYSTEM USING POST-PRINTING PROCESSING APPARATUS

(75) Inventors: Makoto Anno, Tokyo (JP); Masanori Matsuzaki, Yokohama (JP); Masamichi Akashi, Funabashi (JP); Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1104 days.

(21) Appl. No.: 11/406,252

(22) Filed: Apr. 19, 2006

(65) Prior Publication Data

US 2006/0238777 A1 Oct. 26, 2006

(30) Foreign Application Priority Data

Apr. 26, 2005 (JP) ............................. 2005-128618

(51) Int. Cl.
*G06F 15/00* (2006.01)
*G03G 15/00* (2006.01)

(52) U.S. Cl. ....................................... 358/1.15; 399/15

(58) Field of Classification Search ................. 358/1.15, 358/1.14, 1.13, 1.2, 1.5, 1.6, 403; 399/8, 399/15, 88, 53, 408, 410; 270/58.8, 58, 19, 270/58.12; 710/8; 235/375

See application file for complete search history.

(56) References Cited

U.S. PATENT DOCUMENTS

| 6,929,595 | B2 | 8/2005 | Shimizu |
| 2004/0046992 | A1* | 3/2004 | Mori et al. .................. 358/1.15 |
| 2006/0238793 | A1 | 10/2006 | Akashi et al. |
| 2006/0239708 | A1 | 10/2006 | Kozuka et al. |

FOREIGN PATENT DOCUMENTS

| JP | 08-016342 | 1/1996 |
| JP | 10-265121 | 10/1998 |
| JP | 2002-199152 | 7/2002 |
| JP | 2003-29482 | 1/2003 |
| JP | 2004-78449 | 3/2004 |
| JP | 2004-115218 | 4/2004 |
| JP | 2004-288096 | 10/2004 |

\* cited by examiner

*Primary Examiner*—Saeid Ebrahimi Dehkordy
(74) *Attorney, Agent, or Firm*—Fitzpatrick, Cella, Harper & Scinto

(57) ABSTRACT

This invention relates to an image forming apparatus having ability information of an available finisher, including a detection unit which detects the stop state of post-processing by the first finisher, a search unit which, when the detection unit detects the stop of the first finisher, searches a finisher that can alternatively perform processing to be executed by the first finisher based on the ability information, and a generation unit which generates post-processing setting information for the second finisher found by the search unit.

2 Claims, 27 Drawing Sheets

FIG. 6

```xml
<!--BOOKBINDING APPARATUS ABILITY INFORMATION-->
<FINISHING>
<FINISHING.FinishingType FinishingType="Bookbinding"/>
<FINISHING.Manufacturer Manufacturer="ABC"/>
<FINISHING.ProductName ProductName="11ABC"/>
    <Booklet>
        <Booklet.BookletTypes Booklet.NumType="6"/>
            <Booklet.BookletType Booklet.BookletTypeName="SADDLE STITCHING FOLD"/>
            <Booklet.BookletType Booklet.BookletTypeName="FLAT STITCHING"/>
            <Booklet.BookletType Booklet.BookletTypeName="CORNER STITCHING"/>
            <Booklet.BookletType Booklet.BookletTypeName="HALF FOLD"/>
            <Booklet.BookletType Booklet.BookletTypeName="FLAT STITCHING FOLD"/>
            <Booklet.BookletType Booklet.BootdetTypeName="CORNER STITCHING FOLD"/>
        </Booklet.BookletTypes>
    </Booklet>
    <Medium>
        <Medium.Type NumMediumType="2">
            <Medium.Type MediumTypeName="Plain"/>
            <Medium.Type MediumTypeName="Fine"/>
        </Medium.Type>
        <Medium.Weight MediumWeightCriterion="4-6Size">
            <Medium.Weight MediumWeightMin="60kg"/>
            <Medium.Weight MediumWeightMax="120kg"/>
        </Medium.Weight>
    </Medium>
    <StapleSpaceInterval>
        <StapleSpaceInterval.Adjust Adjustable="FALSE"/>
        <StapleSpaceInterval.Interval Interval="100mm"/>
    </StapleSpaceInterval>
</FINISHING>
```

FIG. 7

```
<!--CUTTING APPARATUS ABILITY INFORMATION-->
<FINISHING>
<FINISHING.FinishingType FinishingType="Cutting"/>
<FINISHING.Manufacturer Manutacturer="XYZ"/>
<FINISHING.ProductName ProductName="10XYZ"/>
            <Cutting >
                            <MaxInputDimensions>
                                            <MaxInputDimensions.X X="360mm"/>
                                            <MaxInputDimensions.Y Y="360mm"/>
                            </MaxInputDimensions>
                            <MaxOutputDimenstons>
                                            <MaxOutputDimensions.X X="310mm"/>
                                            <MaxOutputDimensions.Y Y="310mm"/>
                            </MaxOutputDimensions>
                            <MinOutputDimensions>
                                            <MinOutputDimensions.X X="80mm"/>
                                            <MinOutputDimensions.Y Y="150mm"/>
                            </MinOutputDimensions>
                            <MaxThickness Thickness="70mm"/>
            </Cutting >
</FINISHING>
```

| # (Unsigned short) | Finisher Name (String) | Manufacturer (String) | Profile Name (String) | Connected (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | false |
| 7 | Finisher-Z | XYZ | finisher-z-of-xyz.xml | false |
| .. | .. | .. | .. | .. |

| # (Unsigned short) | Finisher Name (String) | Manufacturer (String) | Profile Name (String) | Connected (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | true |
| 7 | Finisher-Z | XYZ | finisher-z-of-xyz.xml | false |
| .. | .. | .. | .. | .. |

1601

F I G. 20

```
2600 ─┬─<JDF xmlns="http://www.CIP4.org/JDFSchema 1 1"
       ID="CombinedStitch" JobID="SaddleStitchCut
       special" Type="Combined" Types="SaddleStitching Cutting" Version="1.2">
         <ResourcePool>
2601 ───<SaddleStitchingParams Class="Parameter" ID="Saddle" NumberOfStitches="2"/>
2602 ───<CuttingParams Class="Parameter" ID="Cut"/>
         </ResourcePool>
2603 ───<ResourceLinkPool>
           <RunListLink CombinedProcessIndex="0" Usage="Input" rRef="L1"/>
           <DigitalPrintingParamsLink CombinedProcessIndex="0" Usage="Input" rRef="L2"/>
           <SaddleStitchingParamsLink CombinedProcessIndex="0"
       Usage="Input" rRef="Saddle"/>
           <CuttingParamsLink ComibinedProcessIndex="1" Usage="Input" rRef="Cut"/>
         </ResourceLinkPool>
```

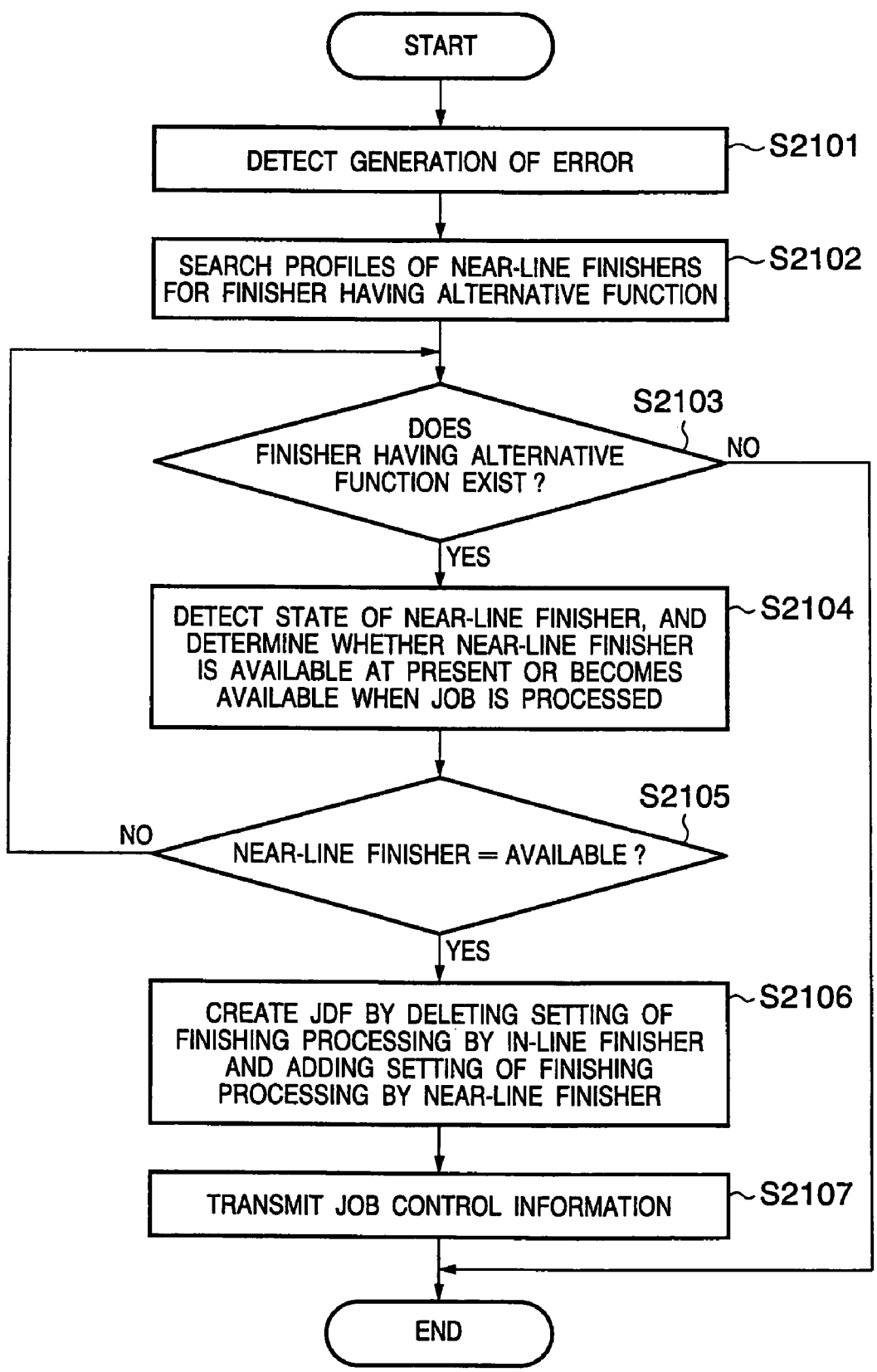

FIG. 23B
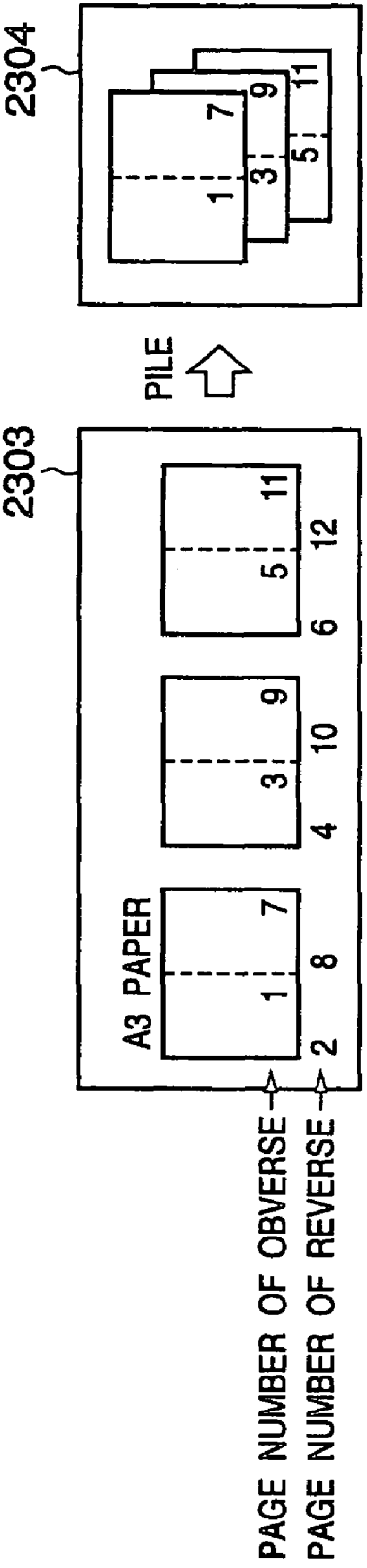
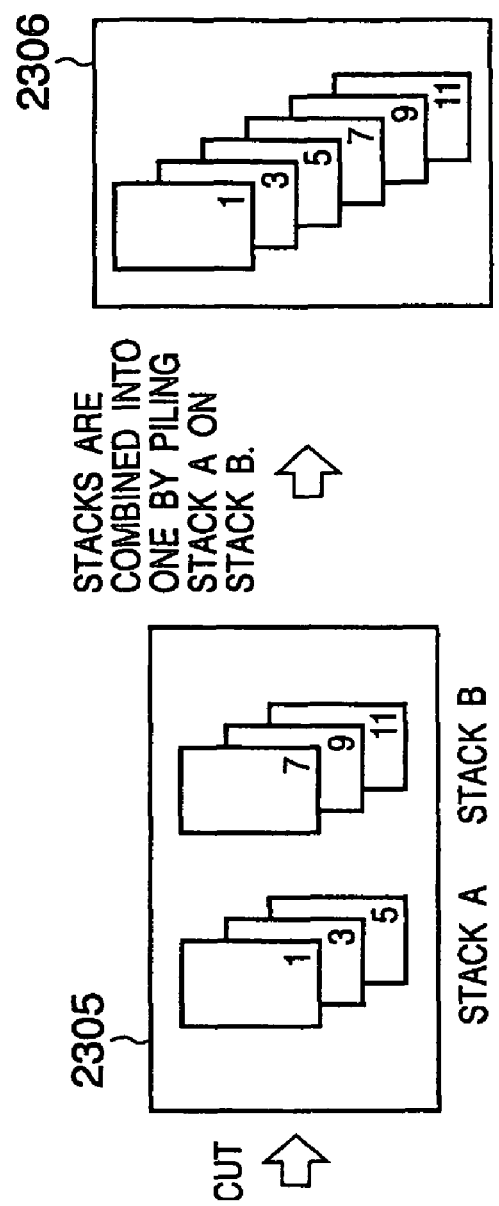

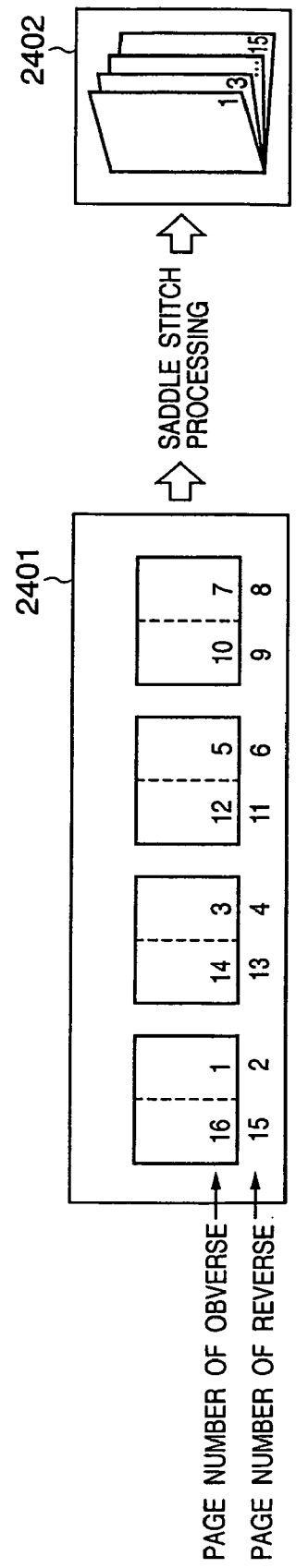

PRINTING SYSTEM USING POST-PRINTING PROCESSING APPARATUS

FIELD OF THE INVENTION

The present invention relates to a printing system configured by connecting, e.g., a post-printing processing apparatus and an image forming apparatus (e.g., a digital copying machine). More particularly, the present invention relates to an image forming apparatus which is integrated with a post-processing unit and can substitute another post-printing processing apparatus for the post-processing unit, and a printing system including the image forming apparatus.

BACKGROUND OF THE INVENTION

A finisher means a post-printing processing apparatus, and is also called a post-press process apparatus or simply a post-processing apparatus. The finisher executes various processes such as bookbinding, cutting, stapling, punching, and collating. Some finishers have multiple functions while others have single functions.

Feature information of an apparatus is information representing the specifications of the apparatus, describes the features (e.g., functions) of the apparatus, and is also called property information. Feature information of the finisher contains information representing the functions of the apparatus, and the feeding order and direction of paper sheets. In the following embodiments, feature information is synonymous with ability information.

Printing attributes are information for specifying how to print, and contain designation of double/single face printing, designation of face-up/face-down, the number of print copies, the paper size, and the layout. In the following embodiments, the printing attributes are synonymous with printing setting information. The printing attributes can be changed by the user within the range of functions of a printing apparatus from a user interface window provided by an application program or printer driver.

Conventionally, POD (Print On Demand) and VP (Variable Printing) are popular as a technique of executing printing processing using XML data. According to the POD or VP technique, printing contents, and printing instructions to a printing apparatus and its peripheral device are described by XML data or the like. For example, according to patent reference 1, contents are described by XML data, and instruction contents such as the character size and the number of print copies are described in a style sheet. By changing the style sheet, desired books can be created under various and different conditions.

XML is sometimes used for post-printing processing. When post-printing processing for a printed product is done using a finisher, a finisher (in-line finisher) connected in line to an image forming apparatus is often utilized as far as the finisher has a necessary function. In this case, the user makes printing settings including post-processing settings by a computer or the like via a user interface provided by a printer driver or the like. The computer creates a printing job described in PDL (Page Description Language) or the like on the basis of the printing settings, and at the same time, generates job control information containing post-processing settings. The job control information is described by, e.g., JDF (Job Definition Format) which is defined using XML. The printing apparatus performs post-processing for a printed product in accordance with the job control information while executing the received printing job and printing (see, e.g., patent reference 2).

As a conventional technique using a finisher apparatus connected to another image forming apparatus, a distributed finishing process technique using a plurality of finisher apparatuses is popular. According to the distributed finishing process technique, an apparatus for performing post-processing is selected by the user from finisher apparatuses connected on a network, and then a printing job is executed (see, e.g., patent reference 3).

[Patent Reference 1] Japanese Patent Laid-Open No. 2004-288096

[Patent Reference 2] Japanese Patent Laid-Open No. 2004-078449

[Patent Reference 3] Japanese Patent Laid-Open No. 2003-029482

However, if post-processing by an in-line finisher stops, the printing job stops and no printed product after the post-processing can be output until the in-line finisher recovers to resume the post-processing. For example, when stapling is done in post-processing and staples run out, the post-processing stops until the finisher is replenished again with staples. Post-processing stops even if another available finisher (near-line finisher) is connected to a network to which a client computer and printing apparatus are connected.

Patent reference 3 describes a method of increasing the efficiency of post-processing by selecting a finisher apparatus in advance by the user, and instructing the selected finisher apparatus to execute post-processing. However, the finisher apparatus which performs post-processing must be set before the start of printing processing. When post-printing processing by an in-line finisher stops, as described above, no other finisher can be requested to take over the post-processing. In the prior art, therefore, if processing of a printing job stops due to generation of an error in a finisher after the processing of the printing job starts, the schedule may be greatly delayed. For example, when information on a device to perform processing, the processing time, and a job to be processed is scheduled in advance on the basis of the delivery date set by the customer, an error in the finisher greatly upsets the schedule. As a result, not only is the printing job delayed in process but a subsequent printing job is also delayed, failing to meet the delivery date set by the customer.

SUMMARY OF THE INVENTION

The present invention has been made in consideration of the above situation, and has as its object to provide an image forming apparatus capable of, when a finisher (post-processing apparatus) connected in line to a printing apparatus (image forming apparatus) becomes unavailable, reassigning post-processing to another finisher, and a control method therefor.

In order to achieve the above object, the present invention comprises the following arrangement. An image forming apparatus having ability information of an available finisher comprises a detection unit which detects a stop state of post-processing by a first finisher, a search unit which, when the detection unit detects a stop of the first finisher, searches a finisher that can alternatively perform processing to be executed by the first finisher based on the ability information, and a generation unit which generates post-processing setting information for a second finisher found by the search unit.

An image forming apparatus having ability information of an available finisher comprises a detection unit which detects a state in which a printing job cannot be achieved by a designated printing setting, a search unit which, when the detection unit detects the state in which the printing job cannot be achieved, searches for a finisher having a post-processing function to be substituted for the printing setting, and a generation unit which generates post-processing setting information for the finisher found by the search unit.

According to an embodiment of the invention, even when no finisher can be used, another finisher can be substituted for it. Since this substitution is performed by the image forming apparatus, no burden of substitution is imposed on a client which issues a printing request.

According to another embodiment of the invention, even when no function associated with image formation can be used, the function of a finisher can be substituted for it. Since this substitution is done by the image forming apparatus, no burden of substitution is imposed on a client which issues a printing request.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing an example of describing the finisher profile of a bookbinding apparatus;

FIG. 7 is a view showing an example of describing the finisher profile of a cutting apparatus;

FIG. 9 is a table showing an example of a finisher management table;

FIG. 14 is a table showing an example of an updated finisher management table;

FIG. 20 is a view showing an example of job control information;

FIG. 21 is a flowchart showing the flow of function substitution processing in the image forming apparatus;

FIG. 23B is a view showing an example of substituting double face imposition and cutting for double face printing;

FIG. 24A is a view showing an example of substituting double face imposition, folding, cutting, and bookbinding for bookbinding printing.

DETAILED DESCRIPTION OF THE PREFERRED EMBODIMENTS

First Embodiment

The first embodiment will describe a printing job (and job control information) to staple each copy. In stapling processing, it is generally set to staple paper at one of the four corners or at two portions along one of the four sides. When an in-line finisher having the stapling function is mounted in an image forming apparatus, it is generally set to perform stapling using the in-line finisher. If staples in the in-line finisher run out during a printing job, a conventional image forming apparatus stops the job and does not resume it until the in-line finisher is replenished with staples. Alternatively, the printing job must be canceled, and another image forming apparatus must be instructed to perform printing including stapling again.

To the contrary, an image forming apparatus according to the first embodiment that is connected to a near-line finisher via a network or the like searches for a near-line finisher having a function alternative to an in-line finisher. If an alternative near-line finisher exists, the image forming apparatus deletes designation of stapling by the in-line finisher from the job control information, and changes settings so as to execute only printing by the image forming apparatus. The image forming apparatus transmits, to the near-line finisher, job control information containing staple setting which is originally to be performed by the in-line finisher of the image forming apparatus. The image forming apparatus causes the near-line finisher to perform stapling processing instead of the in-line finisher. Hence, even if staples run out, processing of the printing job does not stop and can continue. A printing system according to the first embodiment will be explained.

<System Configuration>

Figure 1:
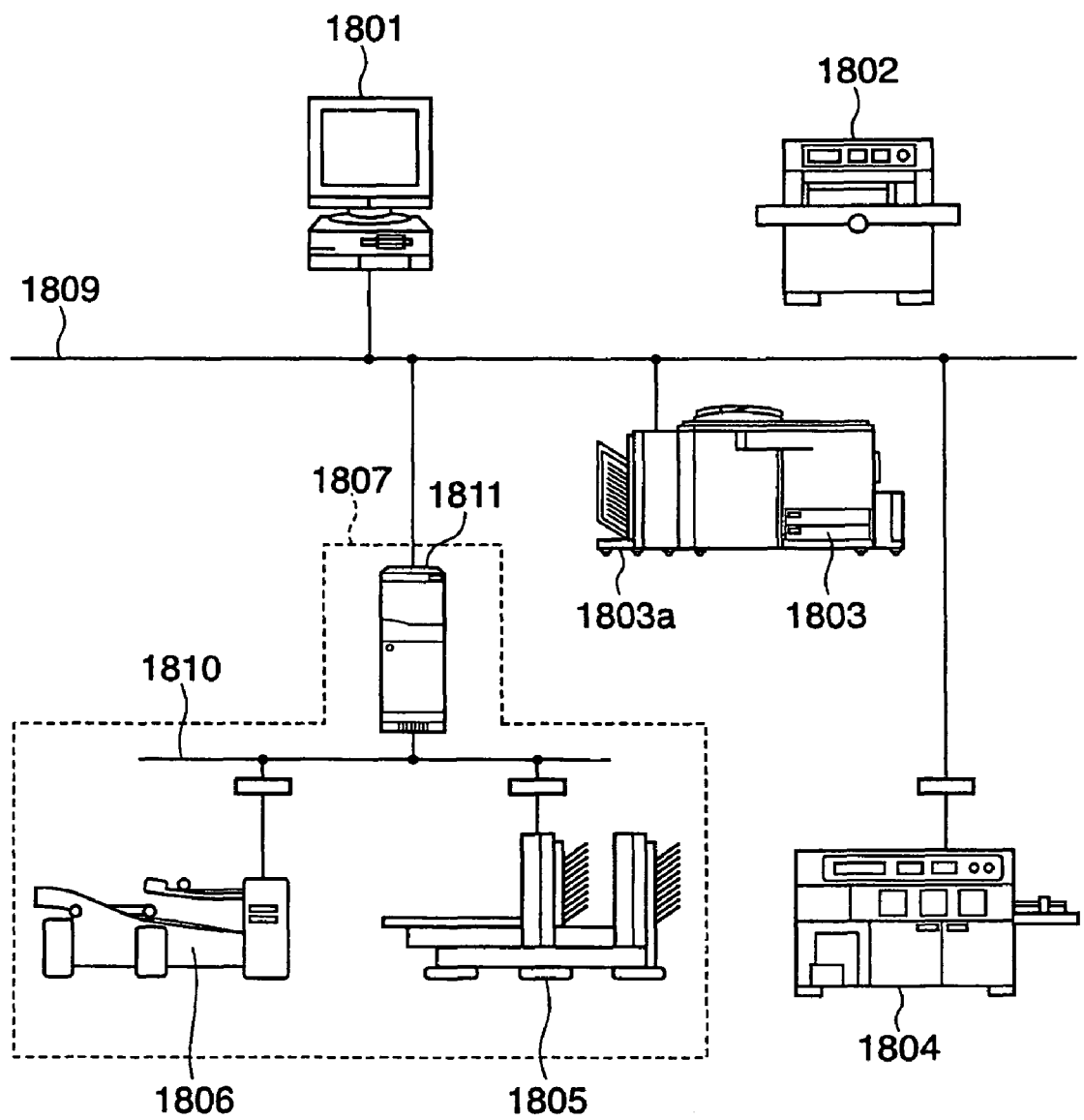
FIG. 1 is a view showing an example of a system configuration according to the present invention.

FIG. 1 is a view showing an example of a system configuration according to the present invention. A DTP (Desk Top Publishing) system in FIG. 1 comprises a client PC 1801, an image forming apparatus (printer) 1803, an in-line finisher 1803a connected in line to the image forming apparatus 1803, a near-line finisher 1804 connected to a network 1809, an off-line finisher 1802 not connected to the network 1809, and a finisher system 1807.

The finisher system 1807 can connect one or a plurality of finishers 1805 and 1806, and a controller 1811 to a network 1810, and control them. Devices connected to the network can communicate with each other via the network. The printer 1803 comprises an image scanner, and is a multi-functional apparatus having not only a printing function but also scan, copy, facsimile communication, and filing functions. Thus, the printer 1803 is also called an MFP (Multi-Functional Printer). The client PC 1801 is an information processing apparatus, has a function of controlling a printer, and is also called a printing control apparatus when attention is paid to the printer control function.

An in-line finisher, off-line finisher, and near-line finisher will be explained in terms of the finisher control method.

An in-line finisher is a finisher whose processing contents to be performed are set from an image forming apparatus. The contents of processing to be performed by the in-line finisher are designated by post-processing setting information. An off-line finisher is a finisher which does not have any means for communicating with an external apparatus (offline). The contents of processing to be performed by the off-line finisher are set in the finisher. A near-line finisher comprises a means for communicating with an external apparatus such as an image forming apparatus. The contents of processing to be performed by the finisher can be input from its operation unit, and also input as, e.g., a job ticket from another device such as a host computer via a network.

The features of each finisher will be described in terms of the convey path (paper path) of a printout product. These features are general ones and are described for easy understanding of the present invention, so the present invention is not limited to the following description. The in-line finisher is physically connected to an image forming apparatus to define one paper convey path. In general, paper printed out from the image forming apparatus is quickly sent to the in-line finisher via the convey path (paper path). In general, the off-line finisher is not physically connected to the image forming apparatus. Paper printed out from the image forming apparatus is temporarily stacked on a truck, tray, belt conveyor, or the like, and then set at the input portion of the finisher. As for the near-line finisher, similar to the off-line finisher, printed paper is generally temporarily stacked and then set at the input portion of the near-line finisher.

<Configuration of Image Forming Apparatus>

Figure 2:
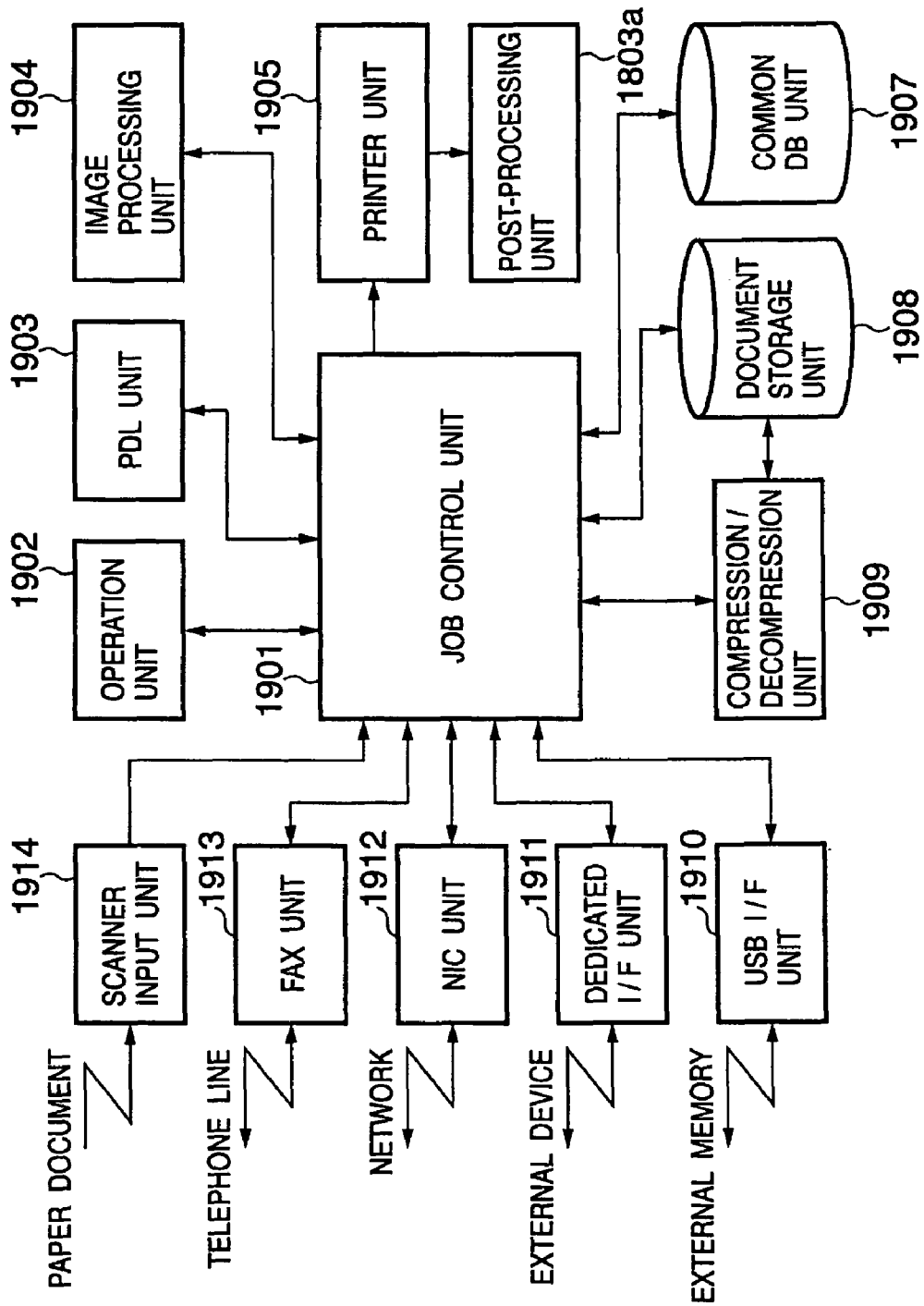
FIG. 2 is a block diagram showing an image forming apparatus.

FIG. 2 is a block diagram showing the image forming apparatus 1803 according to the present invention. As shown in FIG. 2, the image forming apparatus (printer) comprises a scanner input unit 1914, a FAX unit 1913, a NIC (Network Interface Card) unit 1912, a dedicated I/F unit 1911, and a USB I/F unit 1910. The scanner input unit 1914 includes a scanner unit which reads an image, and a scanner IP unit which processes image data. The FAX unit 1913 transmits/receives an image by using a telephone line, which is typified by a facsimile apparatus. The NIC unit 1912 exchanges image data and apparatus information with a computer and the like via a network. The dedicated I/F unit 1911 exchanges information with an external device such as another image forming apparatus. The USB I/F unit 1910 is an interface with a computer or the like serving as a printing data transmitting side. In accordance with the use mode of the printer, a job control unit 1901 controls the whole image forming apparatus to, for example, temporarily save an image signal or determine a path. The job control unit 1901 can be implemented by arranging, e.g., a processor, RAM, and hard disk (not shown), and executing a predetermined program by the processor. The job control unit 1901 can process image data. Image data includes image data from the scanner unit 1914, image data of a facsimile job input via the FAX unit 1913, image data input from an external apparatus (e.g., a computer) via the NIC unit 1912, and image data input from another image forming apparatus via the I/F unit 1911. These image data are temporarily stored in, e.g., the hard disk, then read out, transferred to an output unit such as a printer unit 1905, and printed by the printer unit. Needless to say, image data is not limited to bitmap data, and includes data which is so described as to render an image. For example, when PDL data is received, it is converted into data of a printable format by a PDL unit 1903, and undergoes necessary image processing by an image processing unit 1904. The processed data is printed by the printer unit 1905. The job control unit 1901 controls image data read out from the hard disk in accordance with an instruction from the operator so that the image data can be transferred to an external apparatus such as a computer or another image forming apparatus. A document storage unit 1908 can save and manage a document compressed by a compression/decompression unit 1909. An operation unit 1902 allows the operator to make settings of available finishers and the like. The available finishers are the post-processing unit 1803*a*, i.e., in-line finisher connected in line to the printer unit 1905, and a near-line finisher connected (available) via the NIC unit 1912.

As described above, the image forming apparatus 1803 can set in- and near-line finishers so as to use their functions. Finisher profiles (to be described later) which describe the functions of the finishers are held in the image forming apparatus, and the profile information is transmitted to the computer so as to set functions for use on the basis of the profile information. The setting operation is done by the computer 1801 which reads out a profile. The image forming apparatus acquires the finisher profile by saving, in the image forming apparatus, the profiles of all types of finishers which may be connected in shipping the image forming apparatus. When there is a finisher which is newly supported by the image forming apparatus after shipping the image forming apparatus, the image forming apparatus acquires profile information in the finisher after the new finisher is connected to the network. Further, when no profile information is held in a finisher, or profile information is updated by changing or adding a function after installation, the profile information can be acquired from the Web page of the finisher manufacturer or the like. Hence, even if no finisher profile is held in shipping, the profile can be acquired in use. Note that profile information is information which describes the functional feature of a corresponding apparatus, and can also be called ability information or feature information.

The image forming apparatus holds the finisher profile acquired by the above method in a common DB unit 1907. Then, the acquired finisher profile is registered in the image forming apparatus so that the profile can be used from another device such as a printer driver. Details of registration will be described in the following chapter <Management of Finisher Profile>. After the end of registration, another device can utilize the finisher profile registered in the image forming apparatus via the NIC unit. Note that the network in FIG. 1 is an IP network, and a connected device supports the IP.

<Hardware Configuration of Computer>

Figure 3:
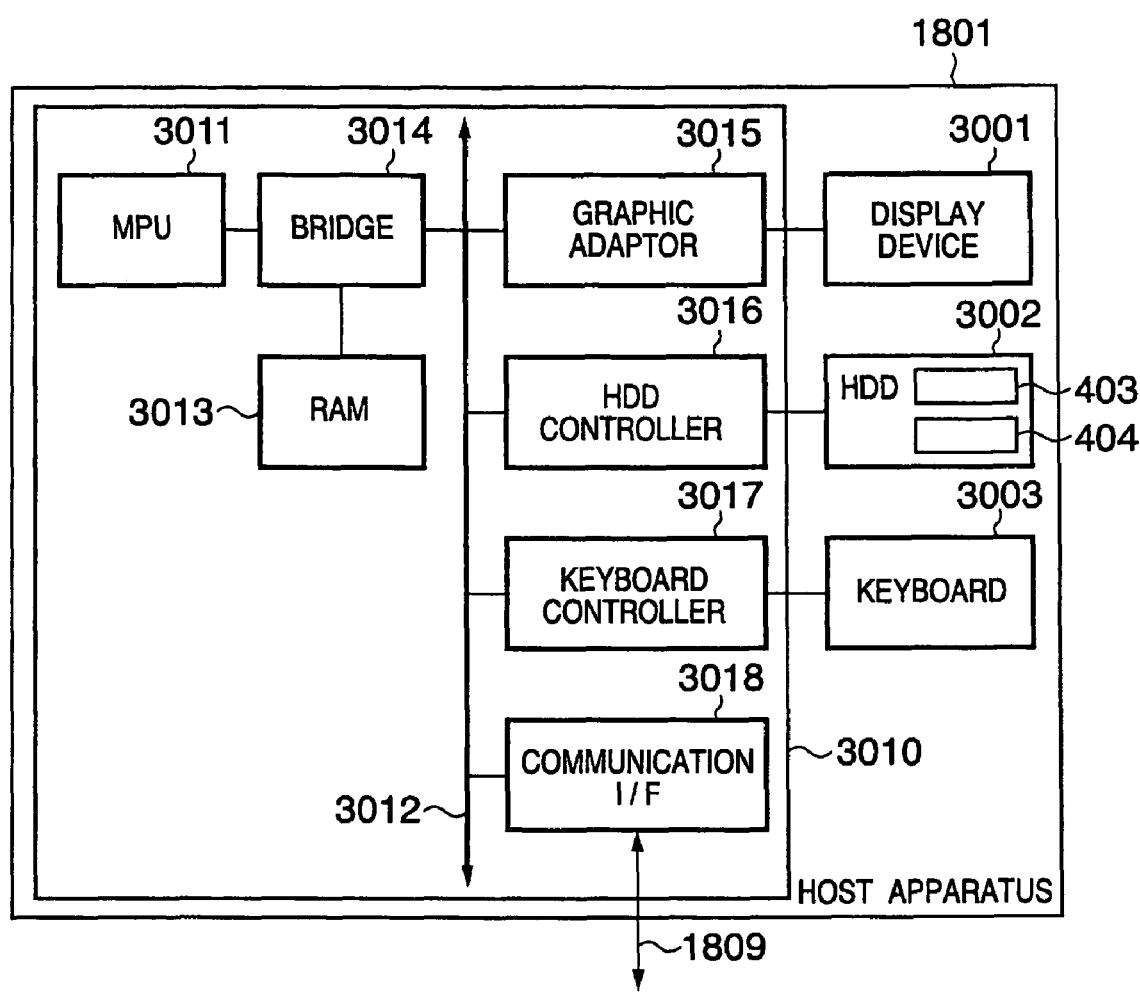
FIG. 3 is a block diagram showing a computer.

FIG. 3 is a block diagram showing an example of the configuration of the client computer 1801. As shown in FIG. 3, the client computer 1801 includes a processing unit 3010 and peripheral devices. The processing unit 3010 of the client computer 1801 comprises an MPU 3011 which controls the overall host apparatus in accordance with a control program, a bus 3012 which connects the building components of the system to each other, a RAM 3013 which stores programs, data, and the like executed by the MPU 3011, a bridge 3014 which connects a system bus, a memory bus, and the MPU 3011, and a graphic adaptor 3015 having a control function of displaying graphic information on a display device 3001 such as CRT.

The processing unit 3010 comprises an HDD controller 3016 which interfaces an HDD device 3002, a keyboard controller 3017 which interfaces a keyboard 3003, and a communication I/F 3018 serving as an interface with the network 1809 at the physical level and link level.

The display device 3001 (in this example, a CRT) which displays graphic information and the like for the operator is connected to the processing unit 3010 via the graphic adaptor 3015. Further, the keyboard 3003, and the hard disk drive (HDD) device 3002 serving as a large-capacity storage device which stores programs and data are connected to the processing unit 3010 via controllers, respectively.

The HDD 3002 saves program files (e.g., an operating system, application, and printer driver), and data files (e.g., printer driver setting information 403 and profile information 404). The printer driver setting information 403 saves values representing the current settings of a printer available by the computer 1801. The profile information 404 saves the profile of an available peripheral device, in the first embodiment, profile information of a printer, in-line finisher, near-line finisher, and the like. The profile information is information representing the features of a device such as the function of the device. More specifically, the profile information represents the functions (e.g., bookbinding function and cutting function) and capabilities of in- and near-line finishers. For example, as for the bookbinding function, the profile shows capabilities (e.g., the bindable position and size, the load weight, and the interval between staples) accompanying the bookbinding function. As for the cutting function, the profile shows capabilities (e.g., the cuttable paper size (maximum and minimum) and thickness) accompanying the cutting function.

The MPU 3011 executes a device driver, application program, and the like including the operating system and printer driver program. These programs sometimes display, on the display, UI windows for requesting the operator to intervene in processing, for example, set parameters or designate execution. The printer driver is prepared in accordance with the model of printer (including an MFP). The printer driver provides the operating system with information on the functions and configurations of a printer and the like, and executes processing for implementing a function unique to the printer model.

<Configuration of Near-Line Finisher>

Finishers are classified into various types by their functions. The first embodiment employs a bookbinding apparatus with the saddle stitch function as an example of an in-line finisher, a cutting apparatus as an example of an off-line finisher, and a perfect binding apparatus as an example of a near-line finisher.

Figure 4:
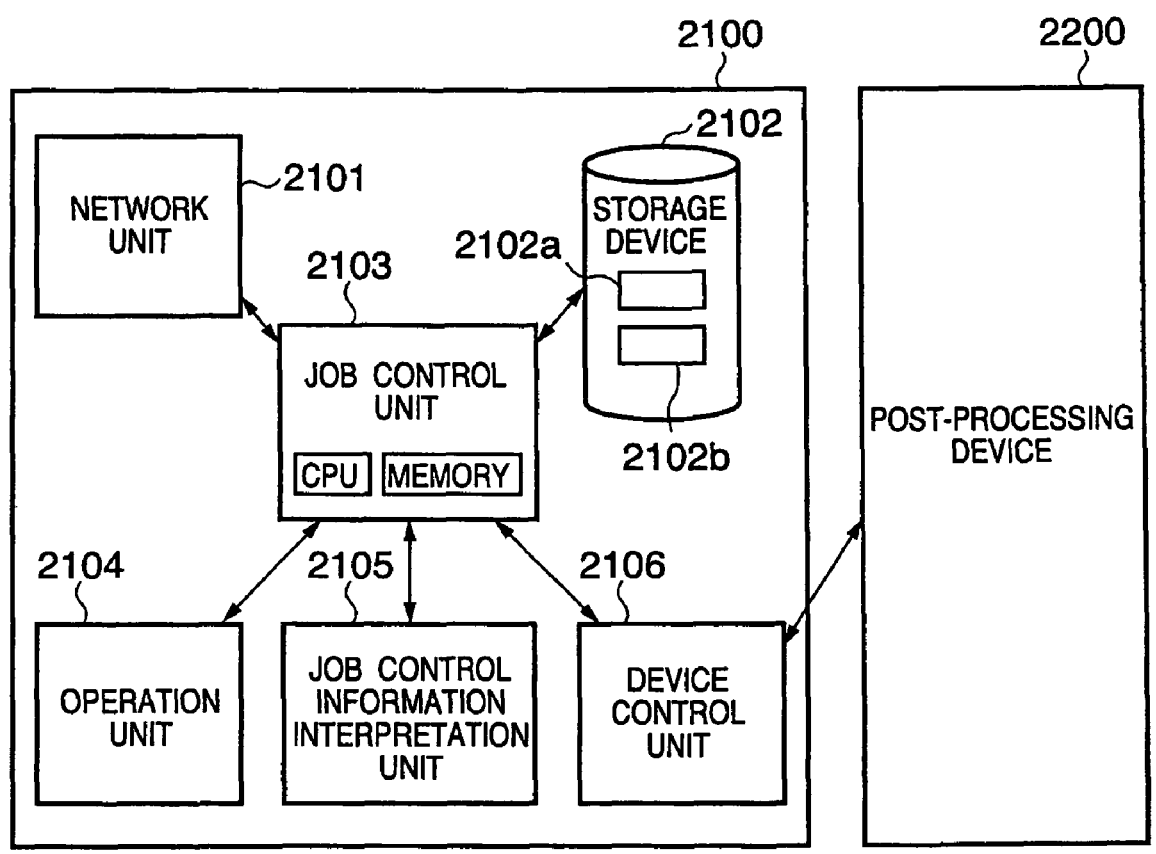
FIG. 4 is a block diagram showing the internal configuration of a near-line finisher.

FIG. 4 shows an example of the functional configurations of the near-line finishers 1804, 1805, and 1806. The near-line finisher comprises a post-processing device 2200, and a controller 2100 which controls the post-processing device 2200. In the controller 2100, reference numeral 2101 denotes a network unit which communicates with another network device such as a host computer or MFP. Reference numeral 2102 denotes a primary storage device (e.g., DRAM) or a secondary storage device (e.g., HDD) which temporarily saves information. Reference numeral 2103 denotes a control unit which controls a job in a near-line finisher and has a processor, memory, and the like. Reference numeral 2104 denotes an operation unit which accepts an ID input from the user. Reference numeral 2105 denotes a job control information interpretation unit which interprets input job control information and converts it into a format capable of controlling a device. Reference numeral 2106 denotes a device control unit which controls the post-processing device 2200. Job control information for controlling a finisher is also called post-processing setting information. The post-processing device 2200 is a processing mechanism which performs post-processing (post-press processing), and has hardware for implementing, e.g., the perfect binding function. These modules configure an in-line finisher.

The controller 2100 comprises a processor which has both a control program execution function and peripheral device control function and controls the whole finisher, a system bus which connects building components in the controller, a ROM which stores a control program executed by the processor, various data, and the like, and a RAM which saves a job ticket and the like. Profile information 2102a is saved in a ROM 3112 or the storage device 2102 such as a hard disk, and in this example, saved in the hard disk. The profile information 2102a is read (or written in advance) by the image forming apparatus 1803 to allow the image forming apparatus to use the near-line finisher.

<Software Configuration of Computer>

Figure 5:
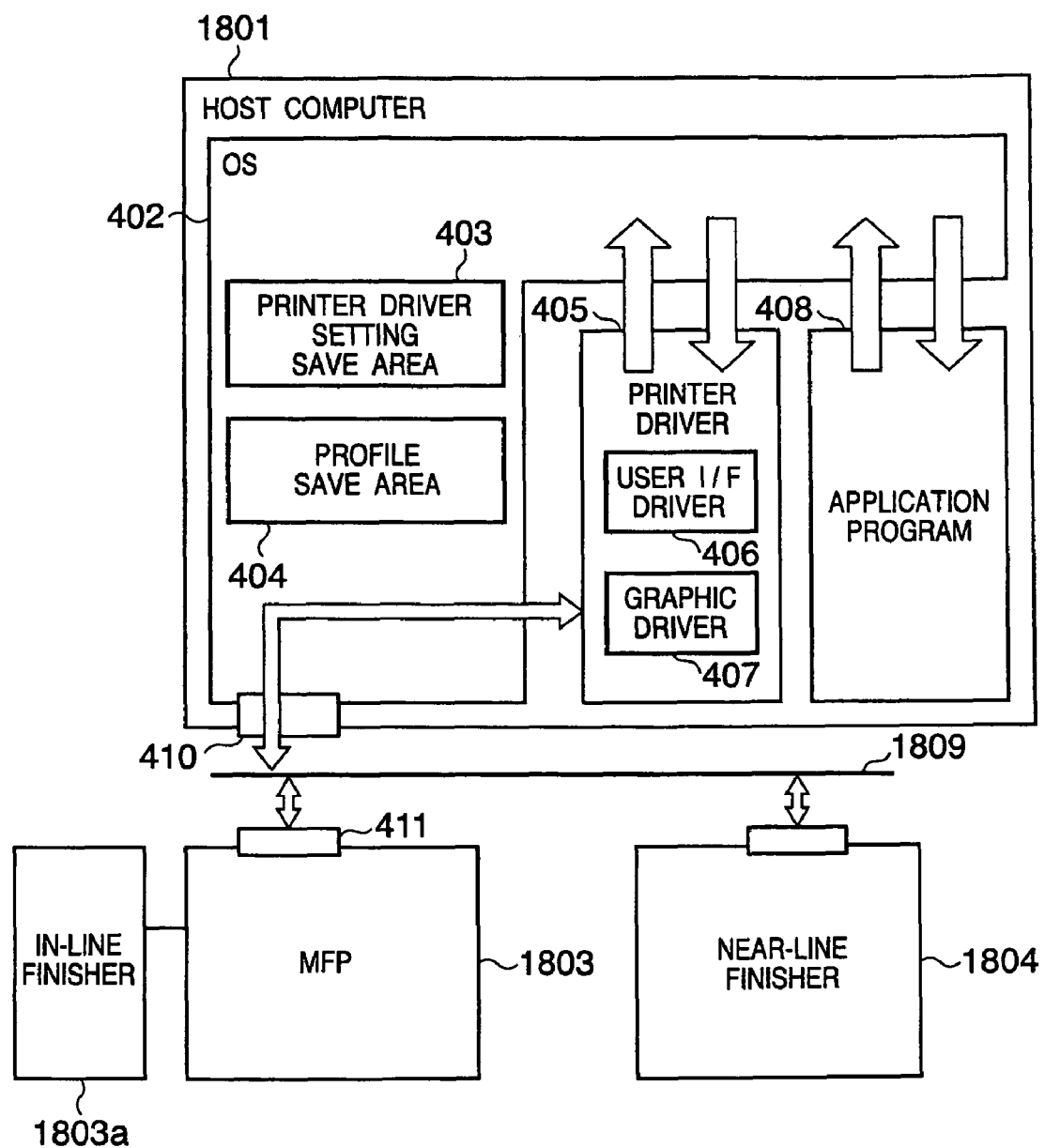
FIG. 5 is a block diagram showing the software configuration of a client computer.

FIG. 5 shows the configuration of software in a client computer containing a printer driver. An operating system (OS) 402 is installed in the client computer 1801. A printer driver 405 and application software 408 are installed on the OS 402 and controlled by the OS 402.

The printer driver 405 is formed from a user I/F driver 406 which displays a user I/F and saves settings, and a graphic driver 407 which converts a printing rendering instruction issued from the application 408 via the OS 402 into a code interpretable by the image forming apparatus. The user I/F driver 406 displays printing setting dialogs and property sheets shown in FIG. 16 to 18 when the application 408 permits the user via the OS 402 to set printing.

Note that the setting save area 403 for the printer driver is ensured in a save area managed by the OS 402. Printing attributes set by the user via the user I/F driver are saved in the printer driver setting save area. The profile information 404 on available devices such as the MFP (printer) 1803 is also saved. The user I/F driver, graphic driver, and application program can access the printer driver setting save area via the OS to read printing attributes set by the user.

The client computer is connected by connecting a communication I/F 410 on the client computer side and a communication I/F 411 on the printer 1803 side via a communication medium such as a network. The client computer is also similarly connected to another network device such as a finisher. The graphic driver 407 can transmit printing data to the image forming apparatus via the OS 402, and can also acquire the configuration information and status of the image forming apparatus and the like via the OS 402.

<Internal Structure of Profile>

In the first embodiment, a finisher profile (=finisher profile information) is described in the XML format. Finishers vary in type such as a bookbinding apparatus, cutting apparatus, and folding apparatus, and the functions of respective types are different from each other. Information greatly changes upon, e.g., adding a new function. In order to properly cope with various functions and changes, the profile is described using XML in a tag format. As a matter of course, the profile can be described in any format as far as addition of a new function and the like can be adaptively described.

FIG. 6 shows an example of describing the finisher profile of a bookbinding apparatus, and FIG. 7 shows an example of describing the finisher profile of a cutting apparatus. In a "FINISHING" tag, "FinishingType" represents a type such as a bookbinding apparatus or cutting apparatus, "Manufacturer" represents a manufacturer name, and "ProductName"

represents a model. FIG. 6 shows "bookbinding apparatus of 11ABC model available from ABC (Type: Bookbinding)". FIG. 7 shows "cutting apparatus of 10XYZ model available from XYZ (Type: Cutting)". Tags "Booklet" in FIG. 6 and "Cutting" in FIG. 7 describe functions unique to the respective models (bookbinding apparatus and cutting apparatus). In this manner, a function unique to each finisher can be individually defined by a tag and described as a profile.

For example, the "Booklet" tag of the bookbinding apparatus in FIG. 6 defines type names "saddle stitching fold", "flat stitching", "corner stitching", "half fold", "flat stitching fold", and "corner stitching fold". The "Medium" tag defines medium types "Plain" and "Fine", and medium weights "60 kg" as a minimum value and "120 kg" as a maximum value. The "StapleSpaceInterval" tag defines that the staple interval cannot be adjusted ("False") and the interval is 100 mm.

In FIG. 7, the "Cutting" tag describes that the maximum input dimensions (MaxInputDimensions) are 360 mm in breadth and length (X,Y). Also, the "Cutting" tag describes that the maximum output dimensions (MaxOutputDimensions) are 310 mm in breadth and length (X,Y), the minimum output dimensions (MinOutputDimensions) are 80 mm in breadth (X) and 150 mm in length (Y). The "Cutting" tag describes that the maximum thickness (MaxThickness) is 70 mm.

In this way, finisher profile information defines the type of function, the manufacturer name, the model name, and the performance (e.g., dimensions and binding position) of each function. The profile information is saved in, e.g., the storage device 2102 of the finisher, and read out and collected by the image forming apparatus.

<Management of Finisher Profile by Image Forming Apparatus>

Figure 8:
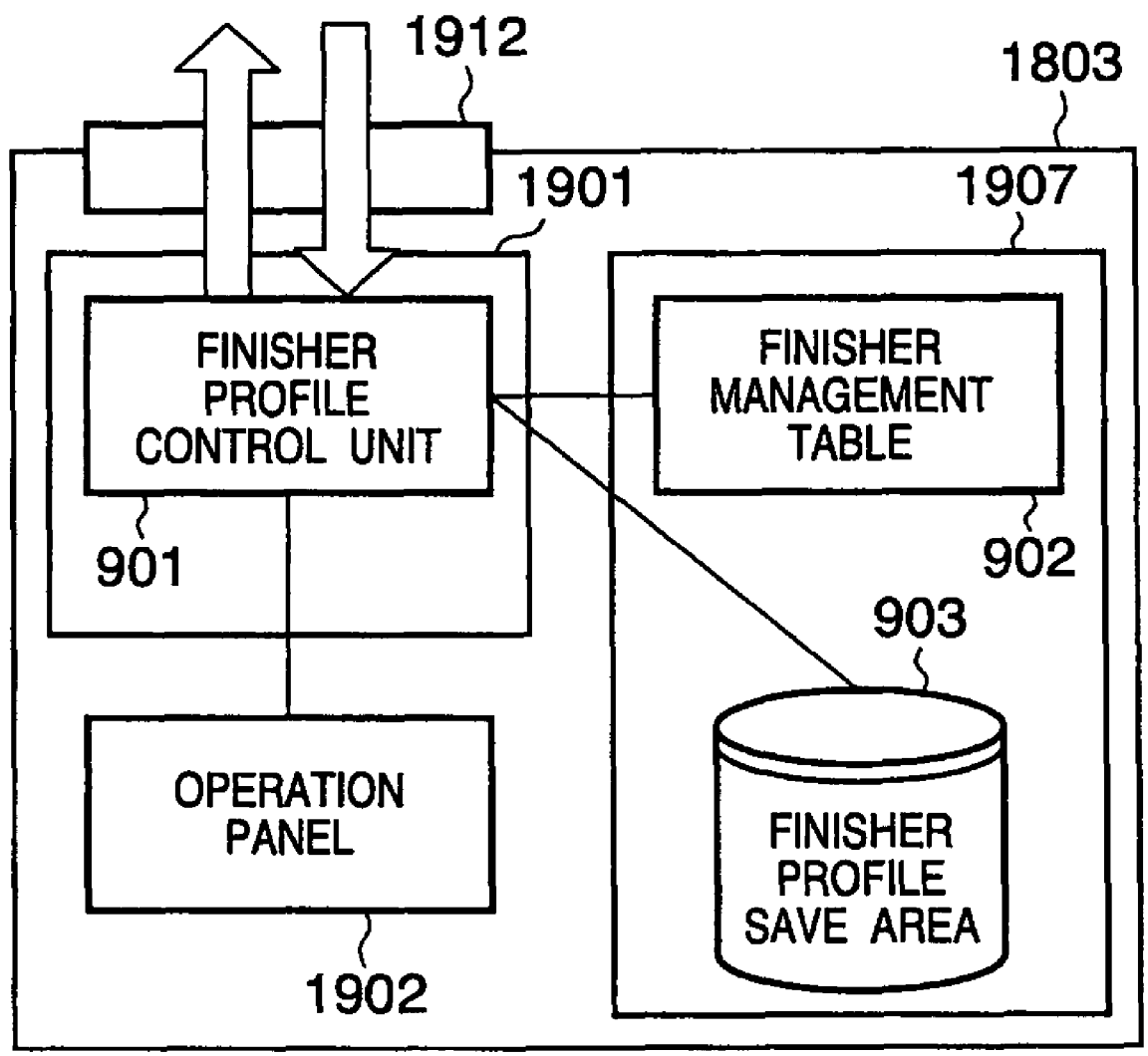
FIG. 8 is a block diagram showing the internal modules of the image forming apparatus.

FIG. 8 is a block diagram for explaining modules associated with a finisher profile in the image forming apparatus 1803. The image forming apparatus 1803 comprises the communication I/F (NIC) 1912 which communicates with the outside, a finisher profile control unit 901 which manages a finisher profile and transmits a profile in response to an external acquisition request, a finisher management table 902 which manages a finisher name, corresponding finisher profile name, connection status, and the like, and a finisher profile save area 903 which saves the entity (e.g., profile information shown in FIG. 6 or 7) of a finisher profile. Information such as the finisher name of a finisher connectable to the image forming apparatus is saved in the finisher management table 902, and profile information corresponding to each finisher is saved in the finisher profile save area 903. The finisher profile control unit 901 is one of the functions of the job control unit 1901, and the finisher management table 902 and finisher profile save area 903 are contained in the common database 1907. Note that the finisher management table 902 can also be implemented by a list of finisher profiles. In this case, no finisher management table 902 need be especially arranged.

FIG. 9 shows an example of the contents of the finisher management table 902. The table 902 stores information on a finisher connectable to the image forming apparatus. In the first embodiment, items of the table 902 are a management number 1002 (variable type is Unsigned Short), a finisher name 1003 (variable type is String), a manufacturer name 1004 (variable type is String), a file name 1005 of a corresponding profile (variable type is String), and a finisher connection status 1006 (variable type is Boolean: "false" represents that the finisher is not connected, and "true" represents that the finisher is connected). For example, in a column of management number #5, the finisher name is "Finisher-X", the manufacturer name is "XYZ", and the profile name of a corresponding profile is "finisher-x-of-xyz.xml". The connection status is "true" representing that the finisher is connected. Other columns can also be similarly interpreted. In this table, finishers except that of management number #5 are not connected.

<Connection Between Near-Line Finisher and Image Forming Apparatus>

Figure 10A:
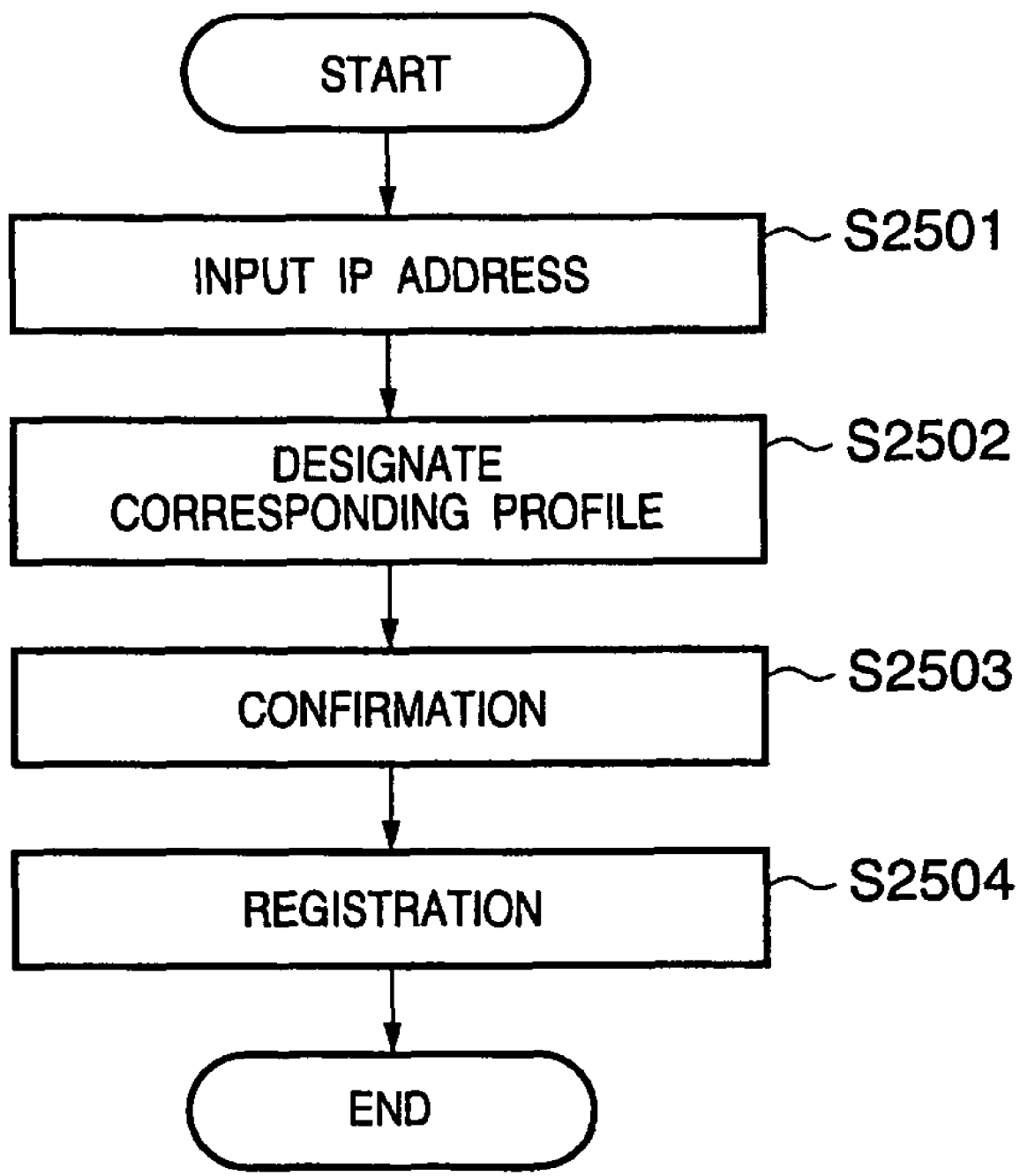
FIG. 10A is a flowchart showing procedures of connecting a finisher.

FIG. 10A shows a flow when the image forming apparatus acquires a finisher profile from a corresponding near-line finisher. That is, FIG. 10A shows procedures when a new finisher is added and registered in the finisher management table. This flow starts when the user designates "option" or "user mode" on the operation panel to change the window to a near-line finisher setting one.

In step S2501, the job control unit 1901 recognizes the IP address of a near-line finisher that is input by the user, and holds the IP address in the image forming apparatus. In step S2502, the job control unit 1901 displays a list of finishers connectable to the image forming apparatus. Since this list is stored in advance in the image forming apparatus, the job control unit 1901 can display the list by referring to a storage unit which holds the list. The user is prompted to select a finisher corresponding to the IP address input in S2501 from a list of the manufacturers and models of near-line finishers, and designate a corresponding profile. In step S2503, the job control unit 1901 outputs a display window for prompting the user to confirm whether the designation in S2502 is correct. If the user inputs "confirmation" representing that the designation is correct, the flow advances to step S2504. In S2504, the job control unit 1901 requests profile information of the finisher at the address input in S2501, and receives and saves the profile information. The finisher corresponding to the saved finisher profile is added to the finisher management table 902. The changed finisher management table is stored in a secondary storage device or nonvolatile memory. As another example, when an ID representing a manufacturer and model can be acquired from a near-line finisher, 15, the job control unit 1901 issues an ID acquisition request to an IP address after the user inputs the IP address. Then, the job control unit 1901 acquires the ID from the near-line finisher, acquires a finisher corresponding to the ID as a connected finisher, and can rewrite the finisher management table. The finisher profile is requested of the finisher at the input IP address, and acquired. The IP address and profile information are saved in association with each other.

Figure 10B:
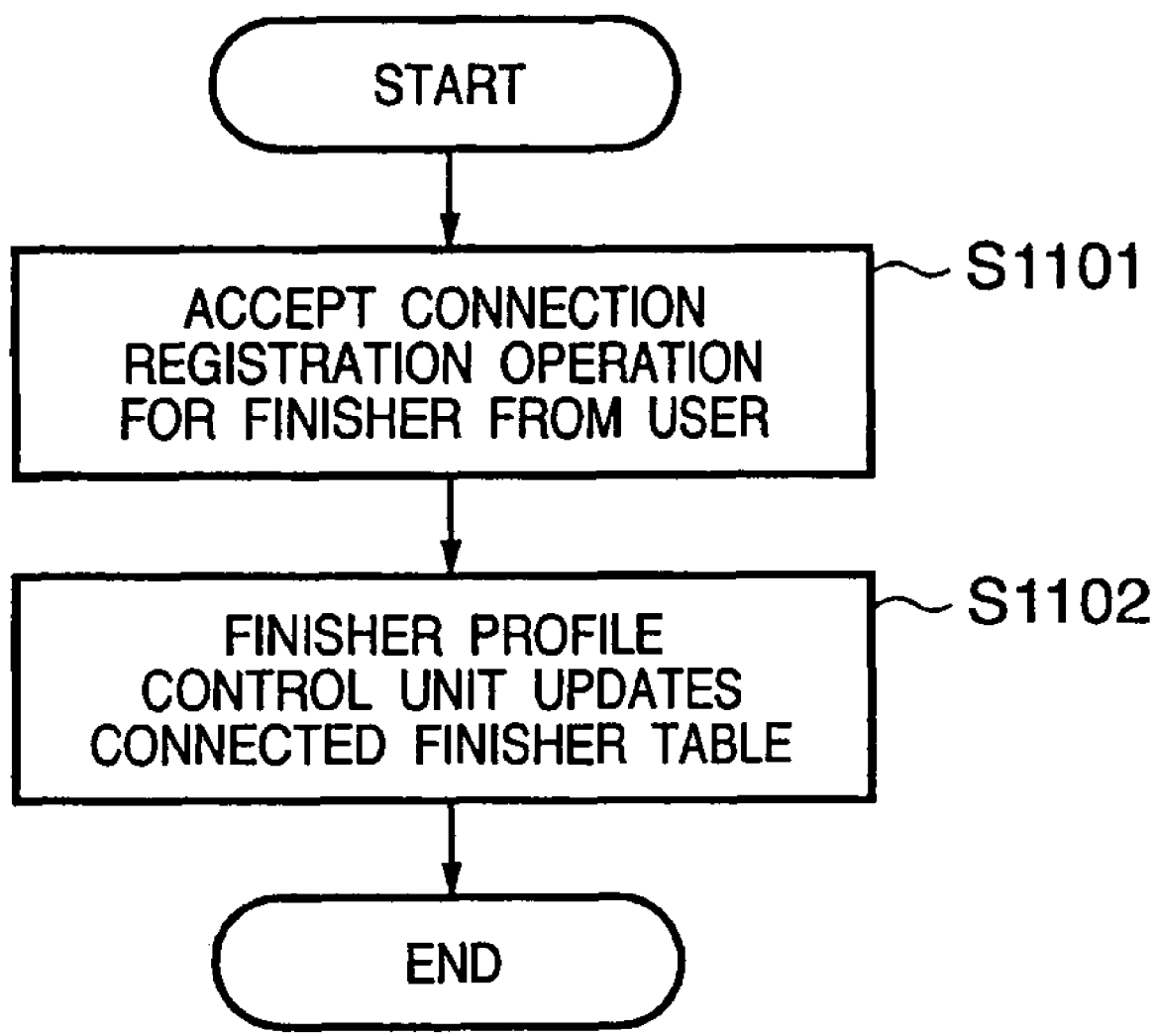
FIG. 10B is a flowchart showing procedures of connecting a finisher.

Procedures when a registered near-line finisher is connected to the image forming apparatus will be explained with reference to the flowchart of FIG. 10B. A near-line finisher to be connected is Finisher-Y available from XYZ. The user installs a new near-line finisher, and connects it to the image forming apparatus via a communication medium. The procedures in FIG. 10B are executed by the finisher profile control unit, i.e., the processor.

Figure 11:
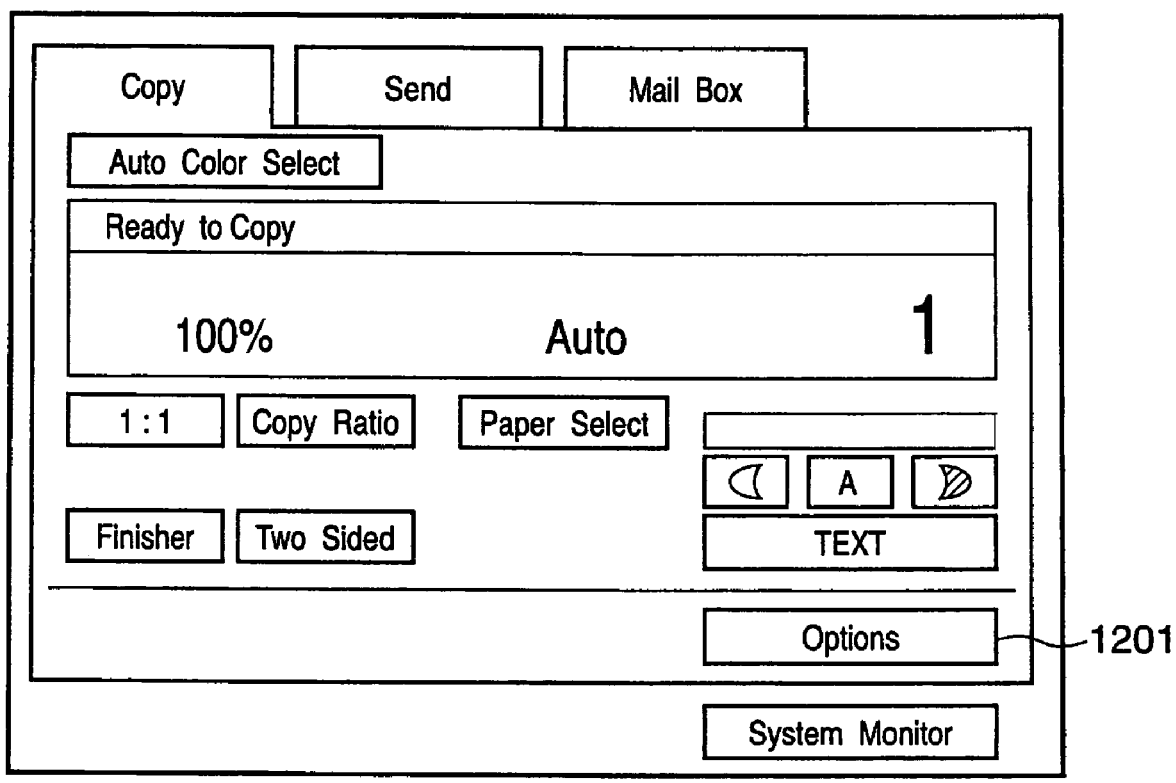
FIG. 11 is a view showing an example of the initial window of the operation panel of the image forming apparatus.
Figure 12:
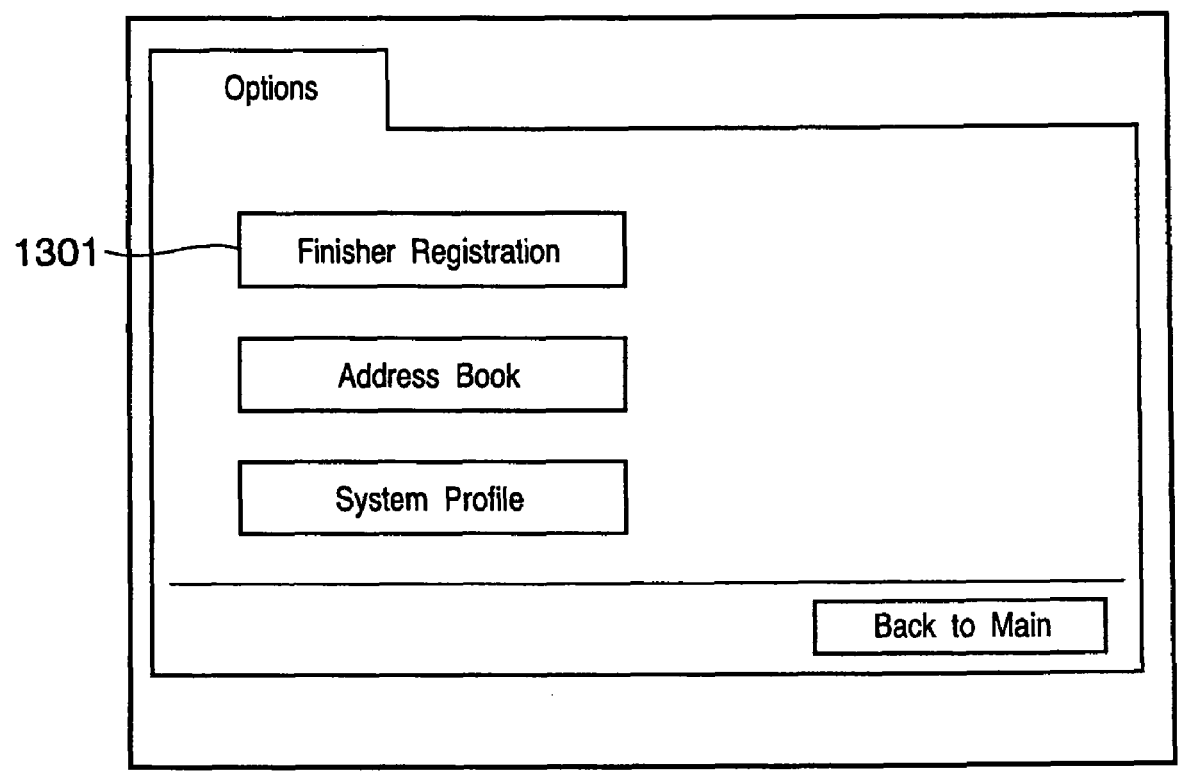
FIG. 12 is a view showing an example of the Options setting window of the operation panel of the image forming apparatus.
Figure 13:
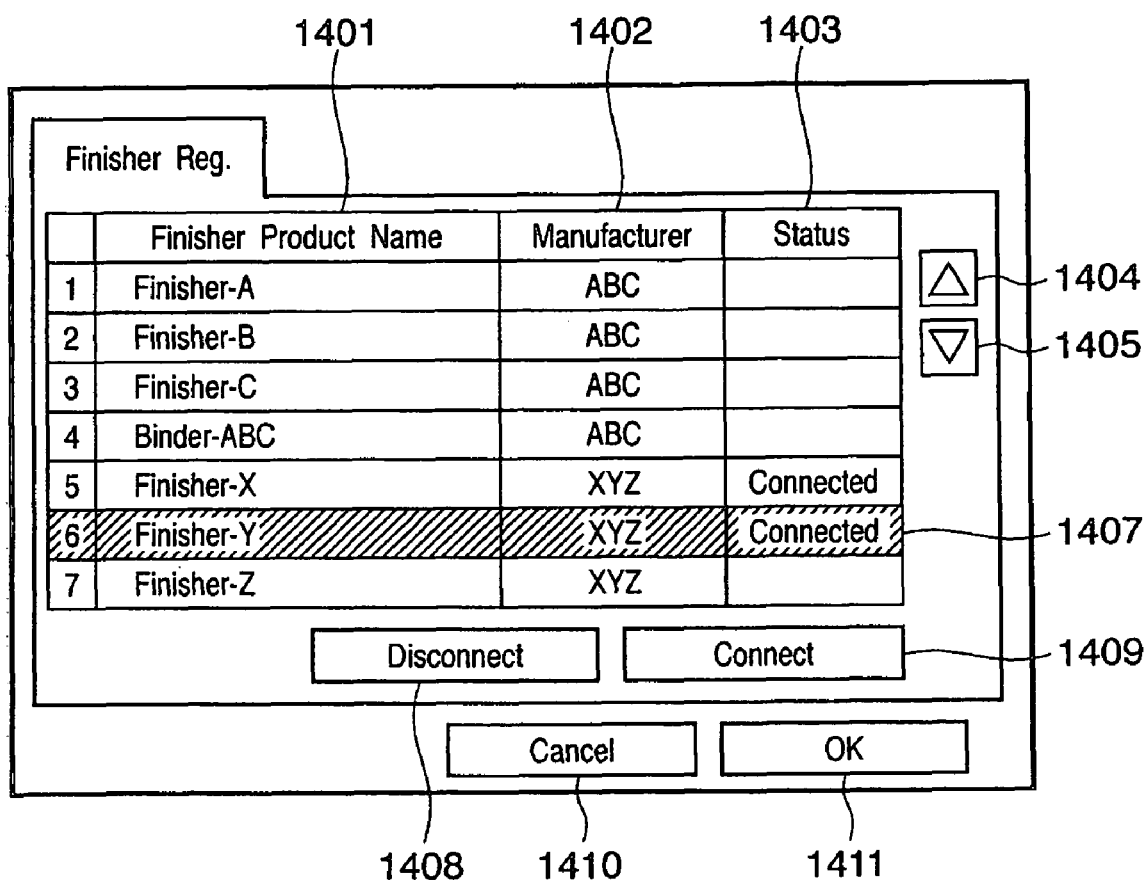
FIG. 13 is a view showing an example of the finisher registration window of the operation panel of the image forming apparatus.

In step S1101, the finisher profile control unit 901 displays a user interface for the purpose of a connection operation by the user. In this window, the user performs a connection operation. In step S1102, the finisher profile control unit 901 recognizes the connection operation by the user, and changes the connection state of the connected finisher into "connected (true)" in the finisher management table 902. This operation will be explained with reference to FIGS. 11 to 13. FIGS. 11 to 13 show operation windows in step S1101.

FIG. 11 shows the initial state of the operation panel of the image forming apparatus main body. In order to make connection setting of a near-line finisher, the user clicks an Options button 1201. This button is used to set options of the image forming apparatus, and clicked to display a window in FIG. 12. Then, the user clicks a "Finisher Registration" button 1301. By clicking this button, a finisher connection setting window in FIG. 13 is displayed. This window displays a list of registerable near-line finishers, and allows registering connection of each near-line finisher. The finisher list displayed in the connection setting window of FIG. 13 is obtained by visualizing the finisher management table 902 except the corresponding profile name 1005. That is, the finisher list is made up of a finisher name 1401, manufacturer name 1402, and connection status 1403. This list shows seven finishers at once, and a button 1404 or 1405 for moving up or down the displayed list can be clicked to browse finishers listed before and after the seven finishers. Connection registration of a finisher or cancellation of connection registration is done as follows. First, the user selects a target finisher by touching a row on which the target finisher is displayed in the list. Then, to register connection of the finisher, the user touches a "Connect" button 1409; to cancel connection registration, the user touches a "Disconnect" button 1408. In this case, in order to register connection of Finisher-Y available from XYZ, the user touches any portion of a row 1407 to select Finisher-Y. In this state, the user touches the "Connect" button 1409 to register connection of the finisher. Finally, the user touches an "OK" button 1411 to validate the setting and return to the initial window of the operation panel of the image forming apparatus main body. To cancel the registration, the user touches a "Cancel" button 1410 to cancel all contents operated in the window. In this case, updating of the finisher management table (to be described later) of the image forming apparatus is not executed.

A method (step S1102 of FIG. 10B) of updating the finisher management table 902 by the image forming apparatus 1803 will be explained. Since the user connects and registers Finisher-Y available from XYZ in the finisher connection setting window of FIG. 13, the image forming apparatus 1803 updates the finisher management table 902. FIG. 14 shows the finisher management table 902 after this update. The finisher profile control unit 901 sequentially recognizes the above-described settings made by the user in the window of FIG. 13, and the connection state of Finisher-Y in #6 is changed into "true", as shown in a column 1601 of FIG. 14.

By the above procedures, connection registration of the finisher in the image forming apparatus is completed. In the first embodiment, connection of a near-line finisher is set by the user on the operation panel of the image forming apparatus after the finisher is connected. However, connection can also be registered by another method as far as the finisher management table can be updated. For example, since the image forming apparatus and near-line finisher are connected via a communication medium, the protocol in connection is defined. The image forming apparatus and near-line finisher communicate with each other on the basis of this protocol, and the image forming apparatus automatically registers connection of the near-line finisher.

The image forming apparatus further executes steps of transmitting a finisher profile acquisition request to a connected near-line finisher, and receiving a finisher profile transmitted by the near-line finisher in response to the request. The received finisher profile is saved in the finisher profile save area 903. The name of the received finisher profile is registered in the finisher profile name 1005 of the finisher management table 902. The address of the finisher is registered in association with the finisher profile.

As for an in-line finisher, its finisher profile is initially stored in the image forming apparatus. If the in-line finisher is actually connected, a signal representing that the in-line finisher is connected is input to the job control unit 1901. This signal functions as a trigger, and, for example, a flag representing that the in-line finisher is connected is set. In other words, according to the first embodiment, an operation representing that an in-line finisher is registered or connected is not necessary for an in-line finisher.

<Acquisition of Finisher Profile>

Procedures of acquiring the finisher profiles of in- and near-line finishers by the printer driver from the image forming apparatus and saving the finisher profiles will be explained.

Figure 15:
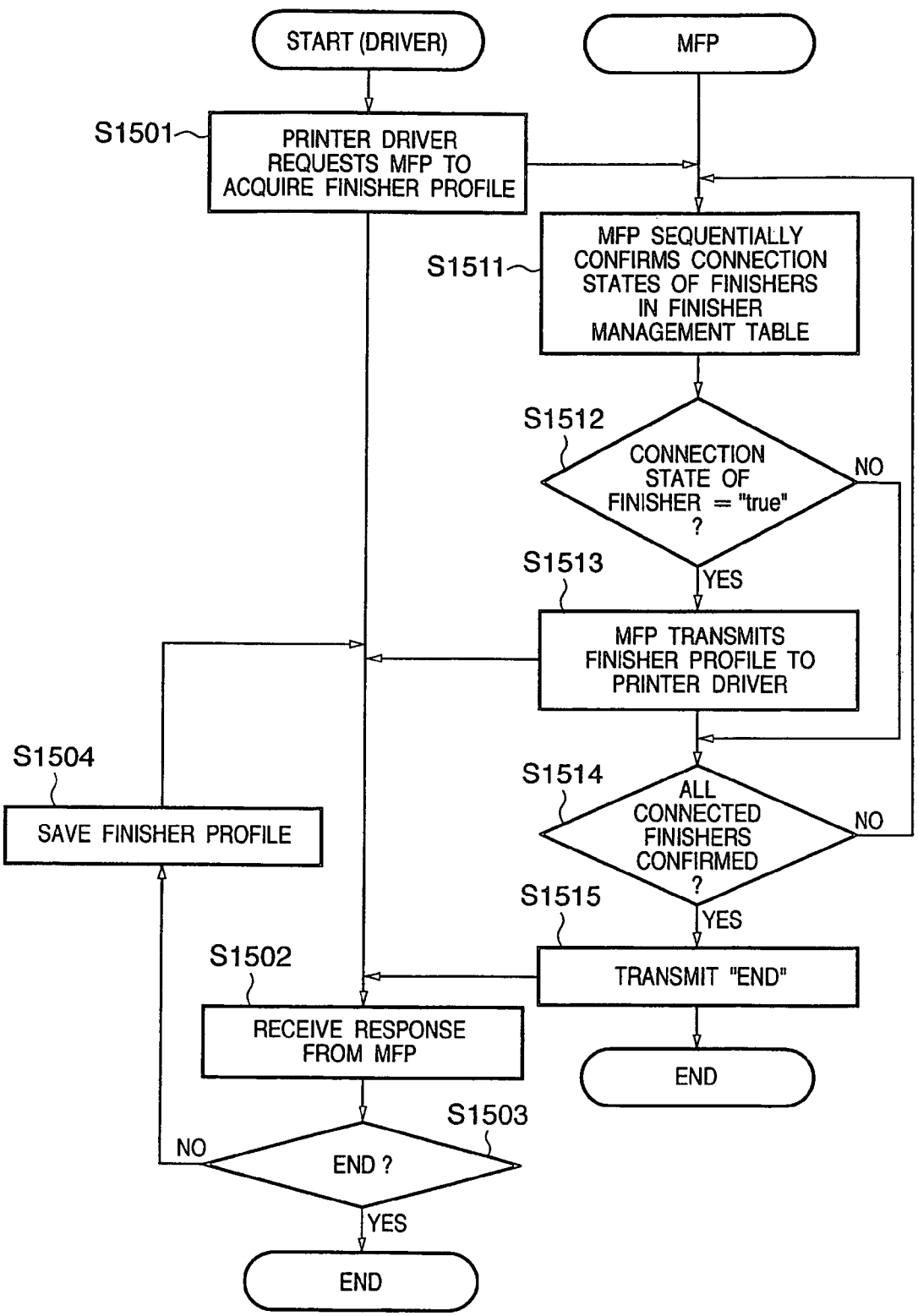
FIG. 15 is a flowchart showing a finisher profile acquisition method.

In the configuration of FIG. 5, the storage area 404 is a storage area (profile save area) in the OS where a finisher profile acquired by the printer driver 405 from the image forming apparatus is saved. The printer driver 405 acquires a finisher profile from the image forming apparatus via the API (Application Programming Interface) of the OS, and saves the acquired finisher profile in the profile save area 404. In order to request and transmit a finisher profile, a communication medium is used between the communication I/F 410 on the host computer side and the communication I/F 411 on the image forming apparatus side. Note that the protocol used for communication is not particularly designated as far as acquisition of a finisher profile can be requested from the printer driver and the entity of the finisher profile can be transmitted. A method of acquiring a finisher profile by the printer driver from the image forming apparatus will be explained with reference to a flowchart. FIG. 15 is a flowchart showing this procedure. Processing in FIG. 15 is executed, for example, when the computer is powered on, when the user designates printing processing, or in accordance with an explicit instruction by the user. Note that steps in FIG. 15 to be processed by the driver are processed by the MPU 3011 in the host computer, and steps to be processed by the image forming apparatus 1803 are processed by the job control unit 1901.

In step S1501, the printer driver 405 requests the image forming apparatus 1803 to acquire the profile of a finisher which is connected to the image forming apparatus and registered. In response to the acquisition request from the printer driver, the image forming apparatus 1803 transmits a finisher profile to the saved printer driver.

Upon reception of the request, in step S1511, the image forming apparatus 1803 (MFP in FIG. 15) sequentially browses, from the top, the finisher management table held in the common database unit 1907 of the image forming apparatus, and confirms the connection state of each finisher. FIG. 14 shows a finisher management table held in the image forming apparatus. In step S1511, the image forming apparatus 1803 confirms the connection state of "Finisher-A" on a row of identification number 1. The image forming apparatus 1803 confirms that the connection state of the finisher is "false" in the finisher management table of FIG. 14. In step S1512, the image forming apparatus 1803 determines the condition of the connection state. Since the connection state of "Finisher-A" subjected to condition determination processing is "false", the image forming apparatus 1803 advances to step S1514. In step S1514, the image forming apparatus 1803 determines whether all finishers held in the finisher management table have been confirmed. If the image forming apparatus 1803 determines in S1514 that all finishers in the finisher management table have not been confirmed, the flow returns to step S1511. This step is similarly repeated for finishers "Finisher-B", "Finisher-C", and "Binder-ABC" held in the finisher management table.

In step S1511, the image forming apparatus 1803 confirms the connection state of "Finisher-X" serving as the next entry. After the image forming apparatus 1803 confirms that the connection state of "Finisher-X" is "true", the flow advances to step S1513 after condition determination in step S1512. In step S1513, the image forming apparatus 1803 transmits, to the printer driver 405, the finisher profile of a corresponding finisher (i.e., finisher of interest (Finisher-X at this time) in the finisher management table). For this purpose, the image forming apparatus 1803 reads a corresponding finisher profile name ("finisher-x-of-xyz.xml" because Finisher-X is targeted in this step) from the finisher management table 902. The image forming apparatus 1803 extracts a file of this file name from a finisher profile save area 905, and transmits the file to the printer driver (S1513). In step S1514, the image forming apparatus 1803 determines whether all finishers described in the finisher management table have been confirmed. If all finishers have not been confirmed, the flow returns to step S1511. The connection state of the next "Finisher-Y" is also "true", so the image forming apparatus 1803 executes the same processing as that for "Finisher-X". In step S1513, the image forming apparatus 1803 reads the profile name "finisher-y-of-xyz.xml" of Finisher-Y in process. The image forming apparatus 1803 extracts the finisher profile of Finisher-Y from the finisher profile save area, and transmits the finisher profile to the printer driver 405 (S1513). The image forming apparatus 1803 repeats this step for all finishers registered in the finisher management table. After the image forming apparatus 1803 confirms the final finisher in the finisher management table, it transmits, to the printer driver 405 in step S1515, information representing that all finishers have been confirmed. Then, the processes (S1511 to S1515) in the flowchart which should be executed by the image forming apparatus 1803 end.

The printer driver 405 receives a response from the image forming apparatus 1803 (S1502), and determines whether the response contents represent "end" (S1503). If the printer driver 405 determines in S1503 that the response contents do not represent "end", the data received in S1502 from the image forming apparatus 1803 is a finisher profile, and is saved in the profile save area 404 (S1504). In this way, the printer driver 405 acquires the finisher profile of a connected near-line finisher from the image forming apparatus 1803.

Note that the profile of an in-line finisher can be acquired similarly to a near-line finisher. Since in-line finishers connectable to the image forming apparatus are limited, the profiles of all in-line finishers may also be saved in advance in the image forming apparatus 1803. In this case, an activation flag or the like is associated with the profile of an actually connected in-line finisher, and the connection is presented. In processing for finisher setting or the like, an activated in-line finisher is an available finisher.

<User Interface of Printer Driver>

Figure 16:
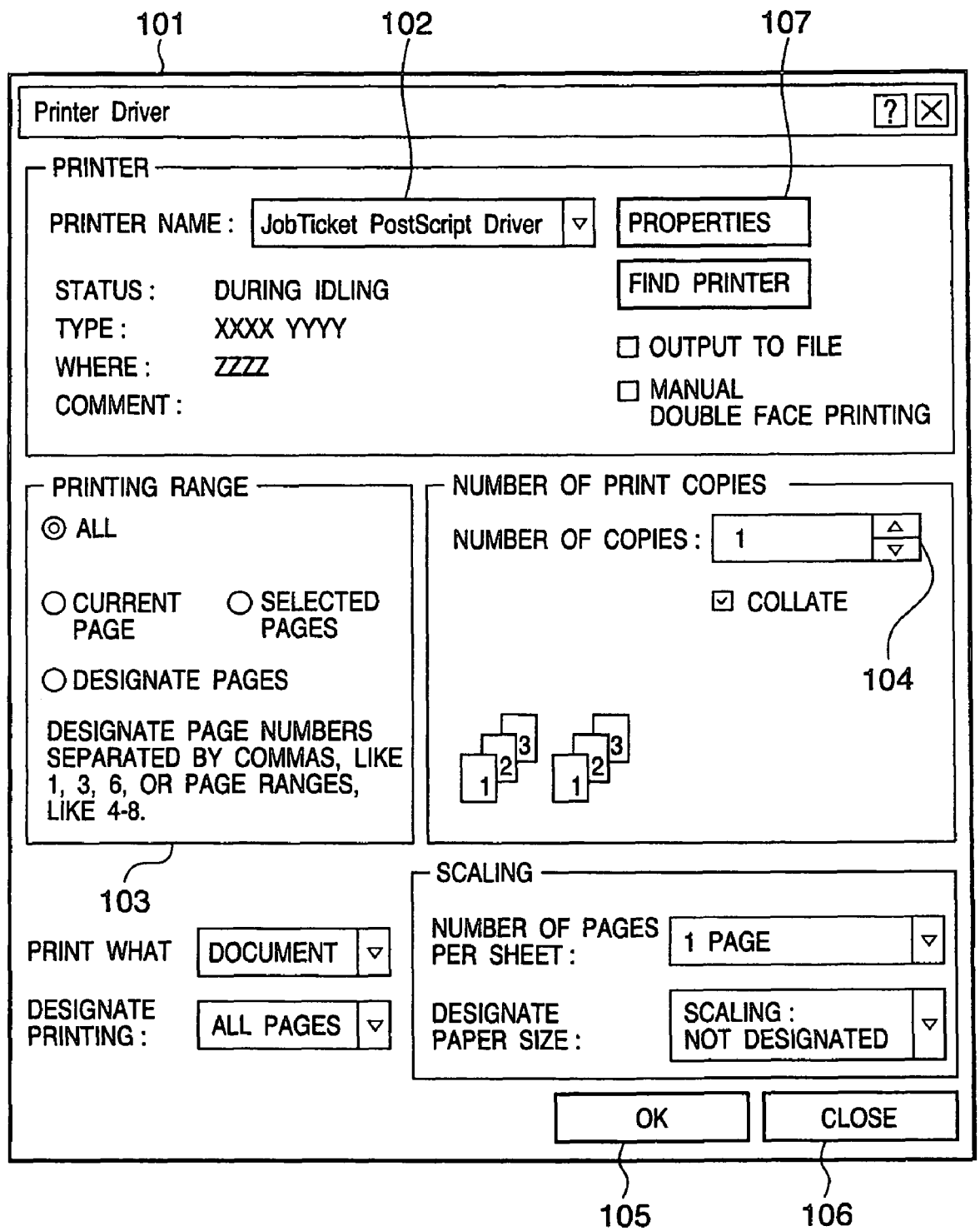
FIG. 16 is a view showing an example of the dialog of a printer driver.
Figure 17:
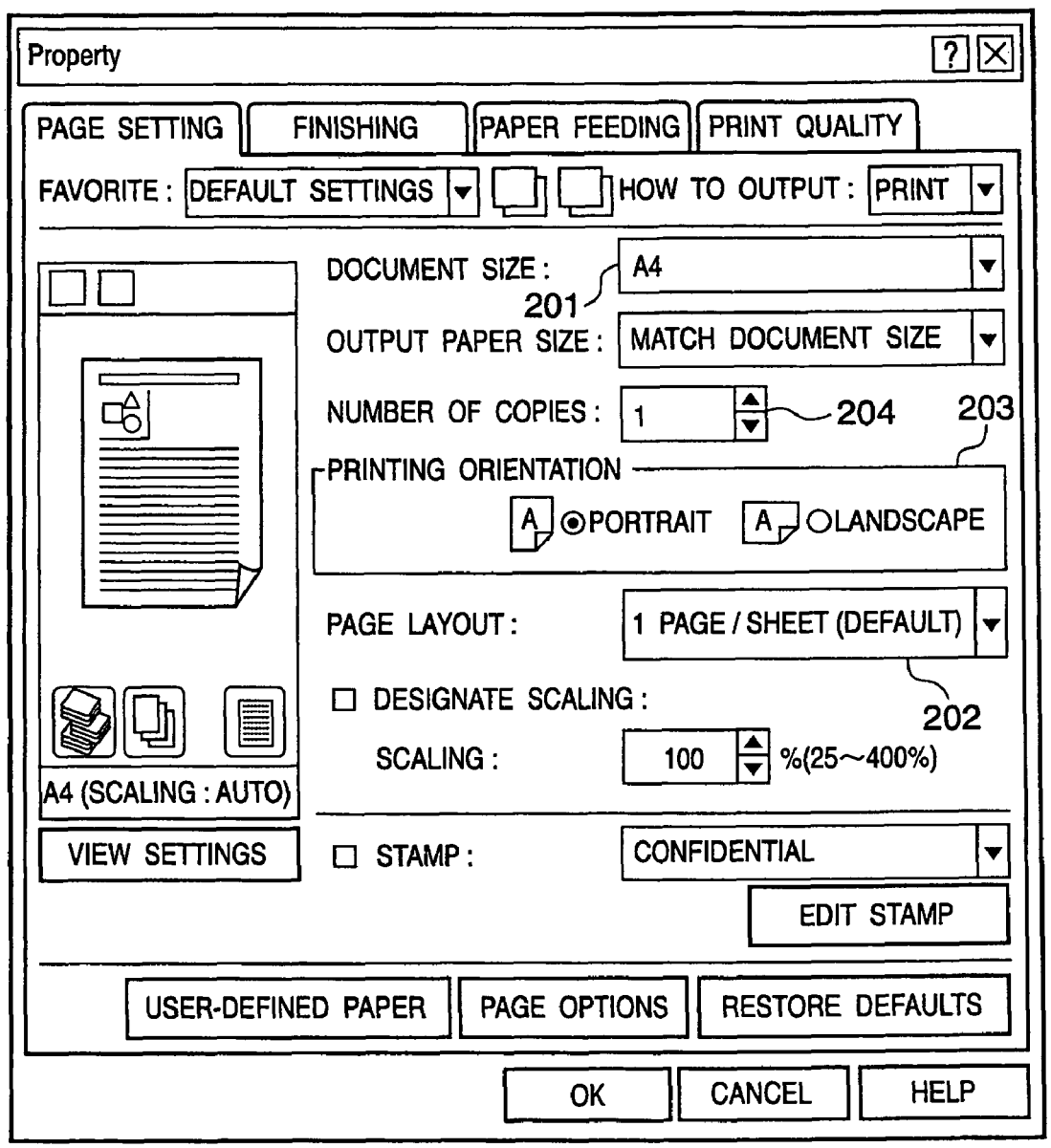
FIG. 17 is a view showing an example of the page setting property sheet of the printer driver.
Figure 18:
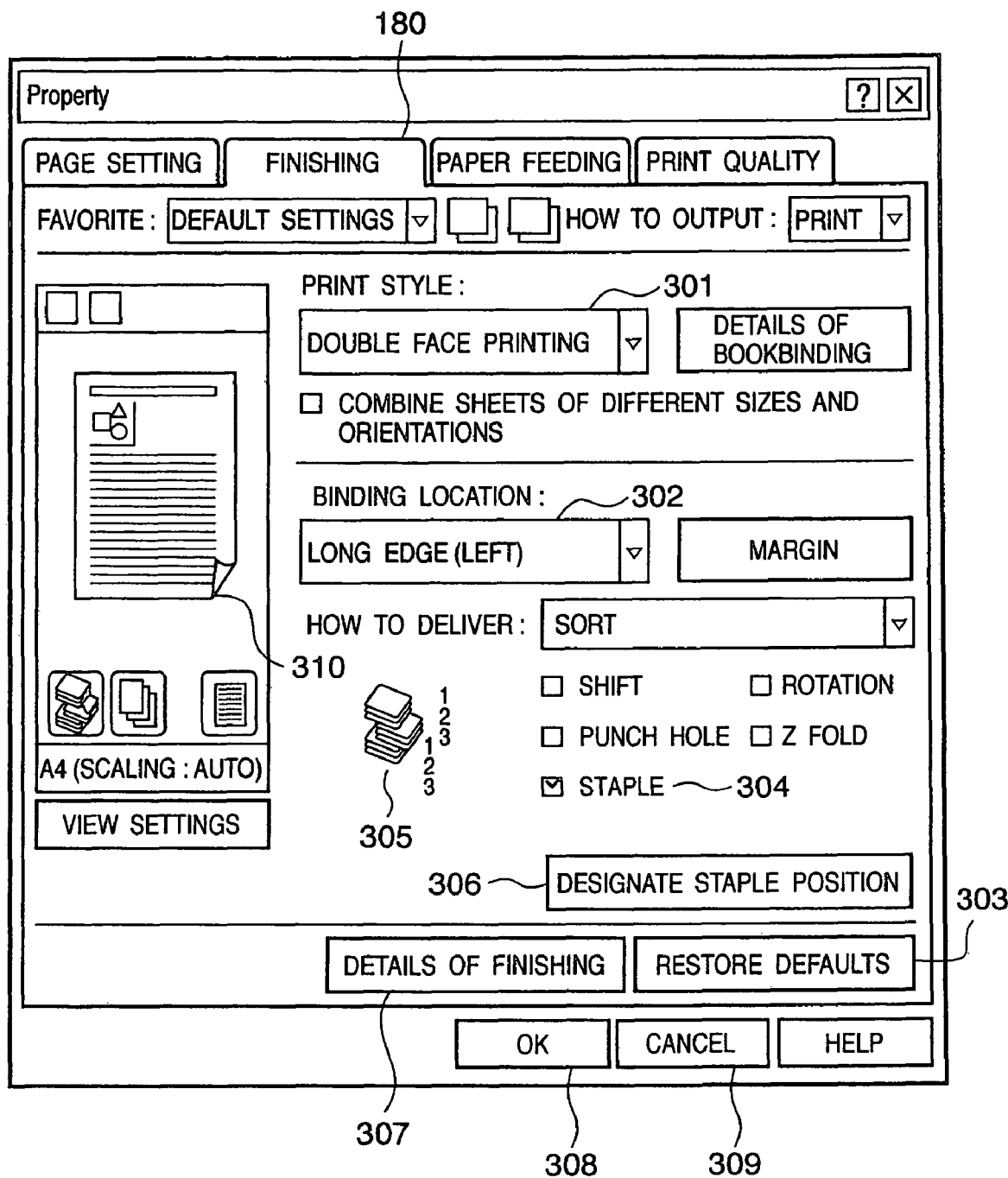
FIG. 18 is a view showing an example of the finishing property sheet of the printer driver.

FIGS. 16 to 18 are views showing examples of user interface windows (to be also referred to as printer driver windows hereinafter) provided by the printer driver. Note that operations and controls to be described with reference to FIGS. 16 to 18 are also incorporated as part of the present invention. The printer driver 405 can display a GUI having a display window structure suitable for designating an output operation (e.g., printing operation) by the image forming apparatus (e.g., MFP or printer) of the system. A printing setting GUI displayed on the computer display when the user designates printing by a key operation is displayed from the operation window of an application or the like. The GUI has a field for displaying and designating the properties of "printer". When the user operates this field, a GUI for displaying and changing printing settings is further displayed. FIG. 16 shows an example of this GUI.

On the GUIs of FIGS. 16 to 18, the user can perform an operation to set desired setting parameters (printout processing condition data). In accordance with input printing setting information, the printer driver generates, from designated data such as an image, printing data corresponding to a transmission destination (also called an output destination) such as a printer. The generated printing data is transmitted by the operating system to the destination device via a network or the like.

In FIG. 16, a window 101 is a printer driver window. Among setting items in the printer driver window 101, a transmission destination selection box 102 is used to select a target output destination. The user can select a desired output destination device of the system via the selection box 102 displayed in the window.

A page setting field 103 is used to select an output page from a job. In the field 103, it is set which page is output out of images created by application software running on the client computer. The user can select a page to be printed out by a device such as the image forming apparatus of the system via the page setting field 103 displayed in the window. The user can print all pages, or specific pages without printing all pages.

A copy count setting box 104 is used to designate the number of output copies of a job to be printed out by the image forming apparatus of the system. The cursor is moved to the position of the box 104, and an arrow (arrow of the scrollbar) shown in FIG. 16 is clicked to increment/decrement the number of copies. A property button 107 is used to make detailed settings of a transmission destination device selected in the transmission destination selection box 102. In response to the button 107 input by the user, the printer driver controls to display various detailed windows shown in FIGS. 17 and 18 on the computer display.

If the user clicks an OK button 105 after making desired settings via various operation windows in FIGS. 16 to 18, printing can start in accordance with settings desired by the user. In order to cancel the processing, the user clicks a cancel button 106. In response to this, the control unit cancels printing, and ends display of the window 101.

FIGS. 17 and 18 show operation windows (GUIs) displayed on the client computer screen in response to a click of the property button 107 by the user in the operation window shown in FIG. 16.

This window has sheets "page setting", "finishing", "paper feeding", and "print quality", and tabs for selecting the respective sheets. The user clicks these tabs (with the operation unit (e.g., pointing device: not shown) of the client computer), and can make settings of various detailed different printout conditions such as settings associated with "page setting", settings associated with "finishing", settings associated with "paper feeding", and settings associated with "print quality".

FIG. 17 shows an example of an operation window (page setting sheet) displayed when the "page setting" tab is clicked. This window includes a paper size setting box 201, imposition layout setting box 202, paper orientation setting field 203, copy count setting box 204, and the like. The paper size setting box 201 is a field for allowing the user to set the paper size of printing paper for a job to be printed. The imposition layout setting box 202 is a field for inputting an instruction to select a layout mode in which document image data of a plurality of pages are laid out and formed on the same plane of one printing sheet. The imposition layout setting box 202 is also a field for selecting, from a plurality of candidates, the number of pages whose images are to be laid out and formed on the same plane of one printing sheet in the layout mode. The paper orientation setting box 203 is a field for prompting the user to select the orientation of paper to be printed from a plurality of selection candidates such as portrait and landscape. The copy count setting box 204 is a field for prompting the user to select the number of print copies of a job to be processed. The user can input desired printing settings in the respective setting item fields of the user interface window.

When the "finishing" tab is selected by a key operation by the user and the printer driver 405 (i.e., control unit 3010) holds a plurality of finisher profiles, one of finishers is selected. In the first embodiment, when an in-line finisher is connected to the image forming apparatus, it is preferentially selected. When only near-line finishers are connected, the user may select a finisher for use. After a finisher is selected, an operation window as shown in a sheet 180 of FIG. 18 is displayed on the display unit in accordance with profile information of the selected finisher.

The window in FIG. 18 is used to set setting information unique to a device selected by the user in the operation window of FIG. 16 from devices of the system, for example, settings for sheet processing including setting of finishing (e.g., setting of stapling processing, that of sorting processing, that of punch processing, that of punching processing, and that of bookbinding processing). In addition, a plurality of setting fields can be arranged which allow the user to execute various detailed settings such as setting of which of single or double face printing is executed, and setting of finer adjustment associated with image processing for changing parameters such as the color tint by a printer. These setting fields permit the user to make various detailed settings as described above. For example, with settings in this display example, an image forming apparatus which is selected by the user in the operation window of FIG. 16 is caused to print a target job in accordance with a "double face printing" mode set by the client via the setting box 301 of the operation window of FIG. 18. Moreover, the image forming apparatus is controlled to execute double face printing processing based on "long-edge binding" setting in the double face printing mode set via a setting box 302. When the user operates a "restore defaults" button 303 in the operation window of FIG. 18, it is controlled to restore detailed printing settings in the operation window of FIG. 18 to default values.

Although not shown, the "print quality" tab similarly makes it possible to select the resolution, halftone setting, and the like.

Reference numeral 308 denotes an OK button. When the button 308 is clicked (designated), property settings are validated, and the window returns to the window of FIG. 16. Reference numeral 309 denotes a cancel button. If the button 309 is clicked (designated), property settings in the setting window of FIG. 18 are invalidated, and the window returns to the window of FIG. 16.

Of printing processing conditions including various detailed settings, output conditions desired by the client are set via the various printing setting windows of FIGS. 16 to 18. Then, the client computer sends a job output request, the printing condition data of the job, and image data of the job. By this processing, an image forming apparatus selected by the client can be controlled to output data selected by the client in accordance with output settings made by the client.

Note that items displayed on the "finishing" sheet after a finisher is selected are displayed on the basis of the printer profile of the image forming apparatus itself and a finisher profile selected from finisher profiles acquired from the image forming apparatus by the procedures of FIG. 15. More specifically, the "finishing" sheet 180 in FIG. 18 shows items corresponding to the functions of a selected finisher (e.g., in-line finisher). These items are given predetermined default values. For example, when the finisher profile in FIG. 6 is held, a "designate staple position" button 306 on the user interface of FIG. 18 is activated. When the "designate staple position" button 306 is clicked by the operator, a selection menu field for selecting the binding method is displayed. In this menu field, six binding methods defined in the "Booklet-Type" tab in the profile of FIG. 6 are provided as selection candidates. The cutting size and the like contained in the profile of FIG. 7 can be set by clicking, e.g., a "details of finishing" button 307 in FIG. 18 and displaying the size after cutting.

<Printing Processing by Host Computer>

Figure 19:
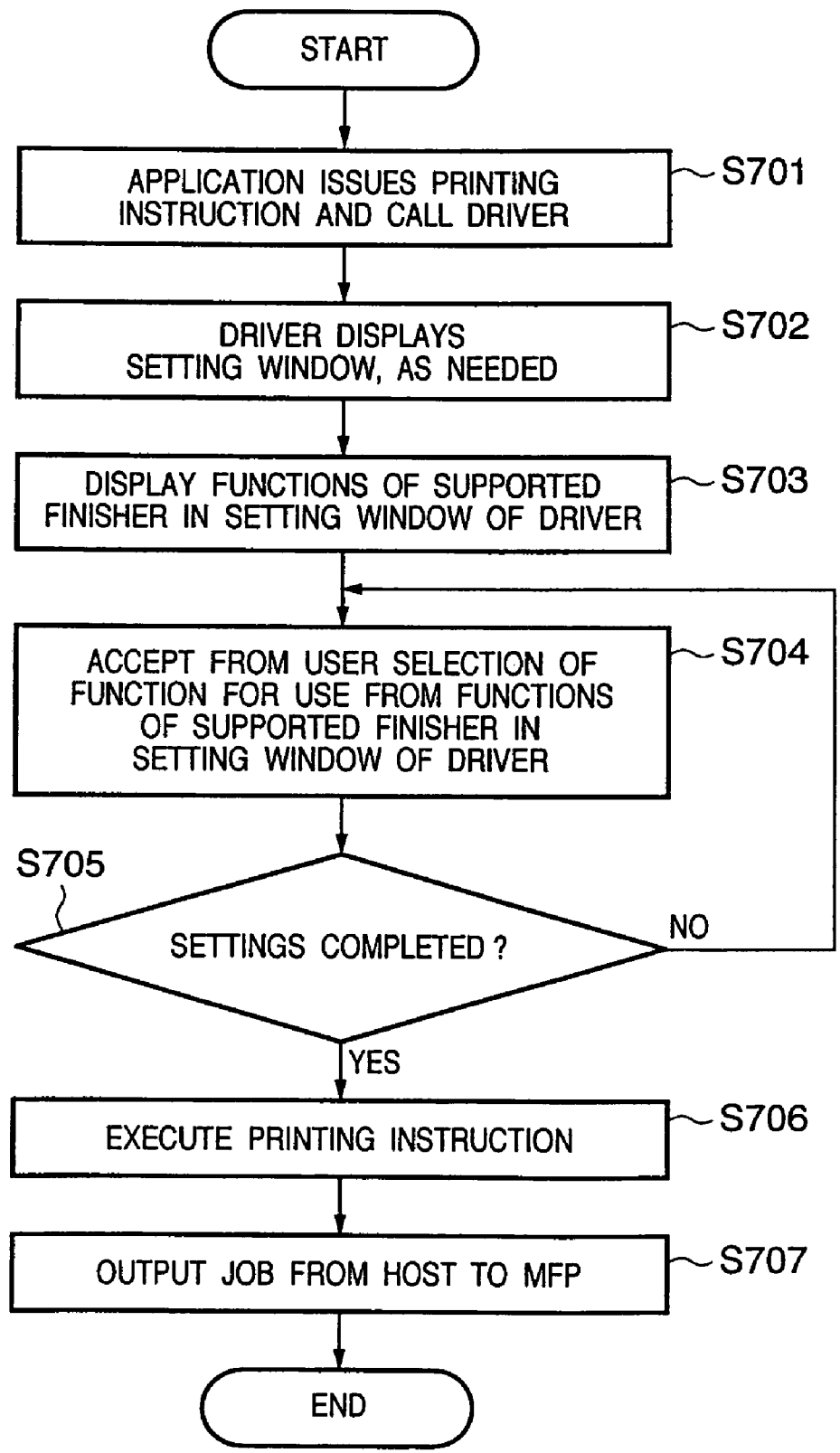
FIG. 19 is a flowchart showing processing in a host.

The flow of setting printing attributes by the user on the printer driver and printing out will be explained with reference to the flowchart of FIG. 19 and the user interface windows of FIGS. 16 to 18. The example in FIG. 19 assumes a case wherein printing settings are changed by the user before the start of printing. Note that processing in FIG. 19 is performed by the MPU in the host computer.

The user uses an application to create data to be printed, and executes an operation to call the printer driver in order to print the data. The printer driver recognizes the processing executed by the user, and recognizes that the printer driver is called (step S701). If the printer driver recognizes that the property button 107 in FIG. 16 is clicked, it displays detailed setting windows (FIGS. 17 and 18) in order to prompt the user to make settings for printing processing (step S702).

In order to set finishing processing for the data to be processed, the printer driver displays a detailed setting window in response to a click of the "details of finishing" button 307 or the like. If an arbitrary finisher is selected in the "details of finishing" setting window from supported finishers which are held as information in the RAM 3013 or the like by the printer driver, the printer driver displays a setting window corresponding to a finishing function provided by the finisher (step S703). Since the functions of finishers supported by the printer driver are held, the printer driver recognizes the selected finisher, and implements the processing in S703 by referring to finisher ability information corresponding to the finisher. The printer driver recognizes a function selected in the setting window which is displayed in S703 and corresponds to the finisher function (S704). More specifically, the printer driver temporarily holds the selected finisher function in the RAM 3013 or the like.

The printer driver repeats the above processing until it recognizes that settings are completed (step S705). If the printer driver recognizes that settings are completed and the OK button 105 in FIG. 16 is clicked, it executes printing processing (step S706). In printing processing, the printer driver outputs, to the image forming apparatus, information (e.g., job control information and rendering instruction (contents of a printing job)) necessary in printing (step S707). More specifically, finisher ability information selected in S704 and the like are held in the RAM 3013. In executing the processing in S707, the printer driver reads out necessary information by referring to the RAM 3013, and can transmit job control information which reflects the selected ability information.

Note that the printer driver outputs job control information to a near-line finisher when the selected finisher is a near-line one, and an in-line finisher when the selected finisher is an in-line one.

For example, in the staple setting user interface according to the first embodiment, a staple setting button window 310, a check box 304, and the "designate staple position" button 306 in FIG. 18 are displayed regardless of whether a selected finisher is an in- or near-line finisher of the image forming apparatus. Before a printing job is transmitted to the image forming apparatus, which of the in- and near-line finishers is to perform processing must be determined. However, the determination rule in staple setting is simple: If an in-line finisher has a set function, it is preferentially selected, and if it does not have the set function, one of near-line finishers is selected in terms of the processing speed, processing cost, and the like. Note that it is desirable to display a window which alerts the user when it is selected to perform stapling processing by a near-line finisher. An example of this window will be omitted. After the above settings are made, it is set to perform stapling processing by the in-line finisher of the image forming apparatus. A printing job and job control information are transmitted to the image forming apparatus. The job control information may be contained in the printing job and then transmitted.

<Example of Structure of Job Control Information>

FIG. 20 shows an example of job control information. In the first embodiment, job control information is called a job ticket which is described in the JDF (Job Definition Format) format. The JDF is defined using XML. In FIG. 20, a "JDF" tag 2600 describes a job ID and the like. A "SaddleStitching-Params" tag 2601 is a parameter setting associated with saddle stitching, and a "CuttingParams" tag 2602 is a parameter setting associated with cutting. These tags are described in a "ResourcePool" tag, and described as resources (functions) used. A "ResourceLinkPool" tag 2603 describes an example of executing saddle stitching and then cutting. The format of this description is defined as the JDF, and processing to be executed can be described in accordance with the function of an in-line finisher. Casing-in bookbinding by a near-line finisher in FIG. 1 can also be described in the JDF. A case has been described in which both a bookbinding apparatus with the saddle stitch function and a cutting apparatus in FIG. 20 are registered as near-line finishers in the image processing apparatus.

In this manner, job control information describes the procedures of post-printing processing (post-press processing) which is to be performed by an apparatus at the destination of the job control information, and is transmitted to the destination. The procedures are parameters which are set to designate details of the operation of a finisher. For example, the procedures are parameters which define the staple position and interval, the number of pages to be stapled, the number of pages to be bound, the number of copies, the cutting size, and the like. The finisher saves parameters specified by the tag of job control information in a predetermined memory area corresponding to the tag, and executes post-processing in accordance with the parameter values. Alternatively, job control information may be directly saved to read necessary parameters using a tag as a key.

For example, job control information is described in accordance with finishing processing settings set in the user interface window of the printer driver, particularly the "finishing" sheet 180 shown in FIG. 18. If saddle stitching is designated on the user interface, the tag 2601 in FIG. 20 is described. This also applies to other post-printing processing settings, and these settings are described in accordance with the JDF definition. For this purpose, a correspondence table is prepared which describes the correspondence between tags described in profile information, the identifiers of setting items, and tags described in job control information, and can be referred to by the printer driver. Fields settable by the user are displayed on the user interface in accordance with tags contained in the profile information. After settings are completed, tags corresponding to the set items (identifiers of items) are added to job control information, forming the job control information. The attribute value of each tag is transmitted to a finisher, read, and set as an operation parameter. This is merely an example, and any method can be adopted as far as set parameters and tags can be associated with each other.

<Printing Processing Flow in Image Forming Apparatus>

When a printing job is transmitted to the image forming apparatus, image information is processed in the image forming apparatus and printed. At the same time, job control information is processed in the image forming apparatus, and collated with finisher profiles held in the image forming apparatus. The image forming apparatus determines a finisher for use and the type of finishing processing to be executed by the finisher. In the first embodiment, job control information for an in-line finisher describes a setting of performing stapling processing at one upper right portion. The image forming apparatus analyzes the job control information, and writes a value, which is described as, e.g., a tag attribute, as a parameter for setting finisher operation corresponding to the tag. The value is not always directly written, but may be converted into a value complying with the finisher. Thereafter, a printing job is processed in accordance with the setting to execute post-printing processing.

A case wherein the finisher cannot continue processing before or while a printing job is processed, for example, a case wherein staples run out in the first embodiment will be considered. In general, a warning "no staple" is displayed for the user, and processing stops until the finisher is replenished with staples. To the contrary, if the image forming apparatus according to the first embodiment detects that a finisher designated by job control information cannot perform designated post-processing, it searches all finisher profiles of the image forming apparatus for a finisher profile having an alternative functional description (tag), i.e., the same functional description (tag) as the functional description (tag) of the designated post-processing. For example, when the designated post-processing is stapling, the image forming apparatus searches for a finisher profile having the same functional description as a functional description "staple" in the profile of an in-line finisher. First, the image forming apparatus searches available finisher profiles for a finisher profile having the functional description "staple", i.e., the staple tag. Then, when a plurality of profiles are detected, the image forming apparatus selects one of them in terms of the provided function, processing time, processing cost, and the like. For example, throughputs described in the finisher profiles are compared to select a finisher profile having the highest throughput. A finisher corresponding to the selected finisher profile serves as an alternative finisher. If only one candidate is detected, it serves as an alternative finisher. If no candidate is detected, the image forming apparatus notifies the user of interruption of post-processing, and waits until the interruption is canceled, similar to the prior art.

After determining an alternative finisher, the image forming apparatus generates new job control information by changing the finisher processing function designated in job control information from the processing function of the in-line finisher to that of the alternative finisher (near-line finisher in this example), and reassigning post-processing settings to the alternative finisher. The image forming apparatus notifies the host which has issued the printing instruction that the processing is reassigned. Further, the image forming apparatus notifies the host to perform post-processing by the alternative finisher for a product printed out from the image forming apparatus. In this specification, it is described to generate new job control information by reassigning post-processing settings to an alternative finisher. However, the present invention is not limited to this, and incorporates a change of job control information.

FIG. 21 shows a processing flow when a finisher cannot continue processing before or while a printing job is processed. Processing in FIG. 21 is performed by the job control unit 1901 of the image forming apparatus.

The control unit 1901 of the image forming apparatus detects that an error occurs in a finisher before or while a printing job is processed (S2101). A detailed description of processing in step S2101 will be omitted because this processing is based on the same method as a method of detecting shortage of paper sheets or the absence of staples, which is generally executed in a conventional image forming apparatus. For example, a signal representing that staples run out is input from an in-line finisher to the job control unit 1901 via the printer 1905.

The control unit 1901 of the image forming apparatus searches the profiles of near-line finishers for a finisher capable of alternatively performing finisher processing of the printing job (S2102). More specifically, profiles representing the functions of near-line finishers connected to the image forming apparatus are held in the internal storage unit of the image forming apparatus, and the control unit of the image forming apparatus can search for an alternative finisher. At this time, the control unit searches for the profile of a near-line finisher having a functional description (tag) of designated post-processing, as described above.

If the control unit of the image forming apparatus determines from the search in S2102 that an alternative near-line finisher exists (YES in S2103), it determines whether the near-line finisher determined to be the alternative is available (S2105). As an example of the determination method in S2105, the control unit 1901 of the image forming apparatus inquires, of the near-line finisher determined in S2103 to be the alternative, whether the finisher is available at present. The control unit of the image forming apparatus may receive the current use status from the near-line finisher at a predetermined interval. Also, a finisher which is "true" in the connection column of the finisher management table can be determined to be available. If the schedule of a finisher is managed by a personal computer, finisher controller, or the like, an available finisher can be found out by referring to the schedule.

If the control unit 1901 of the image forming apparatus determines in S2105 that the near-line finisher determined to be the alternative is available (YES in S2105), it generates job control information for the near-line finisher determined to be the alternative (S2106). More specifically, the control unit 1901 of the image forming apparatus stores, in the storage unit, job control information received from an external apparatus (e.g., host computer). In order to cause the near-line finisher determined to be the alternative to perform post-processing which should be performed by the in-line finisher but cannot be done due to an error, the control unit 1901 of the image forming apparatus generates, from the stored job control information, job control information for causing the near-line finisher to execute alternative processing. In addition to newly generating job control information, as described above, job control information held in the storage unit may be rewritten. For example, job control information received from an external apparatus by the control unit of the image forming apparatus contains information "perform stapling processing at an upper right portion of the page using the in-line finisher of the image forming apparatus". However, when no stapling processing can be executed owing to an error of the stapling function of the image forming apparatus, the control unit of the image forming apparatus generates (or changes) job control information "perform stapling processing at an upper right portion of the page using near-line finisher A" in order to alternatively perform stapling processing by near-line finisher A having the same stapling function. At the same time, the control unit of the image forming apparatus deletes the staple setting from the job control information of the in-line finisher, and changes the settings of the in-line finisher.

The control unit 1901 of the image forming apparatus transmits the job control information generated in S2106 to the near-line finisher determined to be the alternative under a predetermined condition (S2107). More specifically, the control unit of the image forming apparatus holds, in the internal storage unit of the image forming apparatus, the job control information newly generated (or changed) in S2106, and transmits the job control information held in the storage unit in response to a job control information request from the near-line finisher. Also, job control information may be held in the storage unit together with identification information (e.g., job ID), and job control information corresponding to a job ID input by the user to the near-line finisher may be transmitted to the near-line finisher. The job ID is transmitted to the client computer together with a notification that the finisher is substituted. The computer displays the job ID to notify the operator of it. The job ID may be displayed on the operation panel of the image forming apparatus. Details of the operation of an alternative finisher will be explained with reference to FIG. 22.

If the control unit of the image forming apparatus determines in step S2105 that the selected finisher is unavailable, it determines whether another candidate finisher exists. If no other candidate finisher exists, the printing job stops without substituting any near-line finisher for the in-line finisher. If another candidate exists, the flow is repeated from step S2104.

By the processing in FIG. 21, even if an error is detected in the in-line finisher of the image forming apparatus, a near-line finisher capable of alternatively performing finishing processing is searched for, and job control information is generated for the near-line finisher and transmitted. The near-line finisher determined to be the alternative can take over finishing processing requested by an external apparatus. The processing can proceed without being interrupted even if an error occurs in the finishing apparatus which should originally perform the processing.

In the image forming apparatus, even if staples run out, printing is completed because no stapling processing is done. The stapling processing is performed by an alternative finisher, which will be described below, and the user can obtain a desired output.

<Post-Press Processing by Near-Line Finisher>

Figure 22:
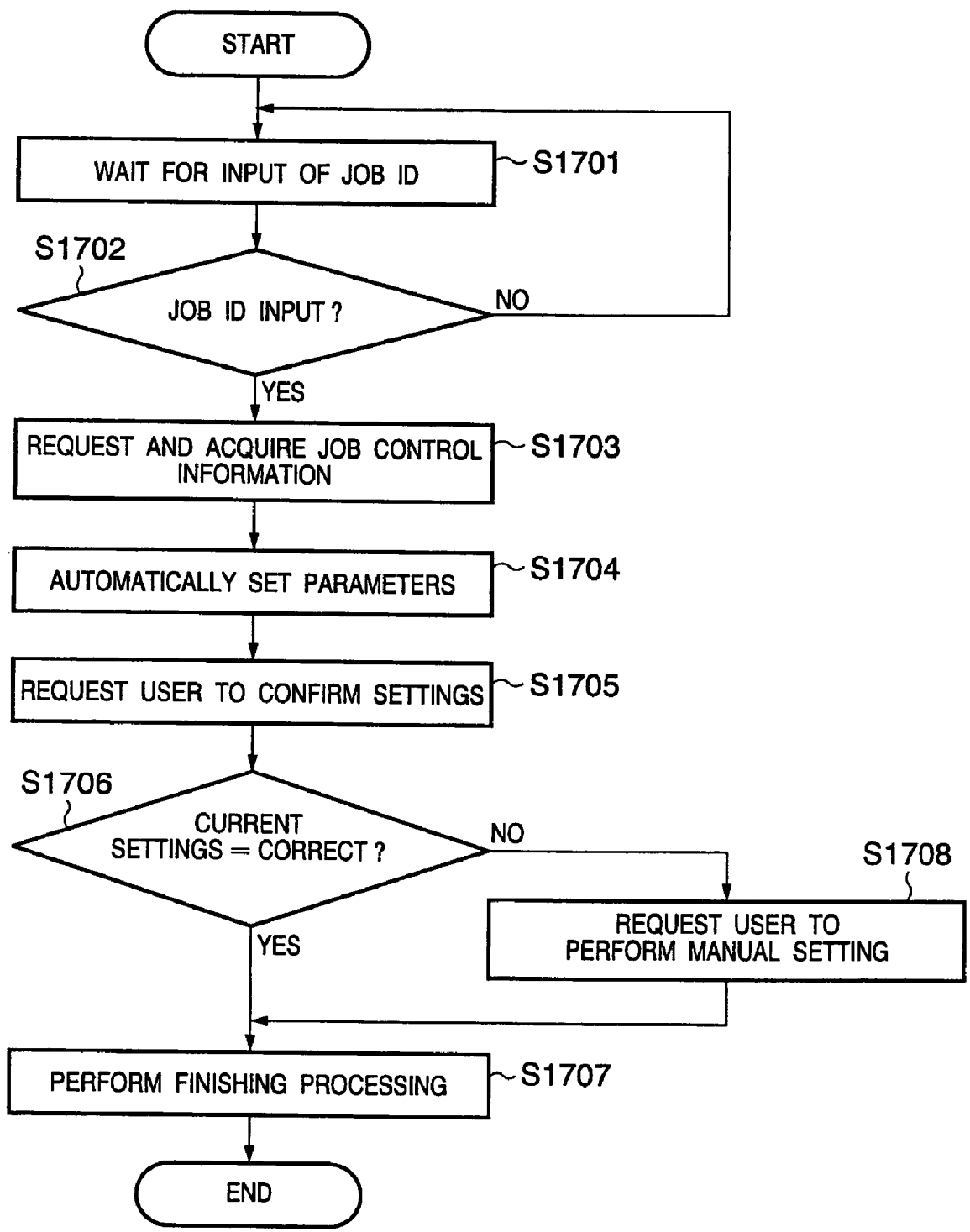
FIG. 22 is a flowchart showing the flow of processing on the finisher side.

FIG. 22 shows the flow of another processing example by a finisher. In this example, the image forming apparatus does not transmit any job control information of an alternative finisher to an alternative near-line finisher, and holds it until the job control information is requested. If the finisher requests the job control information together with the ID of the image forming apparatus, the image forming apparatus transmits the job control information to the alternative finisher in response to the request. Processes in steps of FIG. 22 are executed by a control unit contained in the finisher in FIG. 22.

In this example, the control unit of the finisher waits for a job ID input by the user (step S1701). The control unit of the finisher determines whether the job ID has been input (S1702). As the method of inputting a job ID by the user, the job ID may be directly input to the operation unit of the finisher, or a recording medium which records identification information of the job ID may be loaded into the loading unit of the finisher.

If the control unit of the finisher recognizes the job ID input by the user, it requests job control information corresponding to the job ID of the image forming apparatus, and acquires the job control information (step S1703). If no job ID is input, the control unit keeps waiting for input of the job ID. Note that job control information which is acquired in S1703 and corresponds to the job ID is saved in the storage unit of the finisher.

The control unit of the finisher sets parameters (e.g., paper width) which have conventionally been set manually by the operator on the basis of an output manual and are necessary for post-printing processing (S1704). More specifically, the acquired job control information is held in the storage unit of the finisher, and the control unit of the finisher can analyze the contents of the job control information and set the parameters by referring to the storage unit.

In order to prompt the user to confirm the parameters set in S1704, the control unit of the finisher displays the setting information (parameter information), and determines whether the information is incorrect or correct (S1706). For example, the control unit of the finisher executes the determination processing in S1706 by displaying the set contents analyzed in S1704 on the display unit of the finisher or the like, and recognizing an input representing whether the user authenticates the set contents.

If it is determined in S1706 that the settings are correct, the flow advances to step S1707, and the control unit of the finisher executes finishing processing on the basis of the contents set in S1705. If it is determined in S1706 that the settings are incorrect, the control unit of the finisher prompts the user to perform manual setting in order to correct incorrect contents (S1708). The control unit of the finisher executes finishing processing on the basis of the set contents (S1707). When a plurality of finishers are connected, the same processing is repeated for the next finisher.

For post-processing which cannot be achieved by a selected finisher, the image forming apparatus according to the first embodiment can select another available finisher and cause it to alternatively perform the post-processing. Interruption of an entire printing job by interruption of post-processing can be prevented to increase the productivity. In addition, the availability of the finisher can be increased.

In the first embodiment, a near-line finisher is substituted for an in-line finisher. Instead of this, a near-line finisher can be selected first, and its post-processing can be alternatively performed by another near-line finisher. Also, a near-line finisher can be selected first, and its post-processing can be alternatively performed by an in-line finisher. Post-processing may be executed by combining a plurality of near-line finishers.

Second Embodiment

In an image forming apparatus according to the second embodiment, finishers having compatible functions alternatively perform post-processing. In addition, a predetermined function (or a combination of functions) which provides the same result is detected, and the function (to be referred to as an alternative function) can be substituted for the original function. The configurations of the apparatuses and system are the same as those in the first embodiment. As will be described below, an alternative function is specified, and a finisher profile having the specified post-processing function is searched for in accordance with the procedures in FIG. 21 to generate job control information. Hence, a feature of the second embodiment is to specify an alternative function, which will be explained with reference to FIGS. 23A and 23B.

Assume that the image forming apparatus runs out of A4 paper sheets while processing a printing job to print on an A4 paper sheet. A general image forming apparatus stops the job when paper sheets run out, and does not resume the printing job unless the image forming apparatus is replenished with paper sheets. Alternatively, the image forming apparatus must cancel the printing job, and instruct another image forming apparatus to print on an A4 paper sheet again. However, an image forming apparatus in which a finisher profile having the cutting function is registered can continue the printing job without stopping it. This method will be described in detail.

If A4 paper sheets run out in an image forming apparatus which processes job control information that designates printing on an A4 paper sheet, the image forming apparatus searches all finisher profiles held in it for a near-line finisher having a function of cutting an A3 paper sheet into two. If the image forming apparatus can detect the near-line finisher, it sets execution of printing processing on an A3 paper sheet. Further, the image forming apparatus generates (or changes) job control information of contents for setting processing of cutting an A3 paper sheet into two, and transmits the job control information to the detected near-line finisher.

Figure 23A:
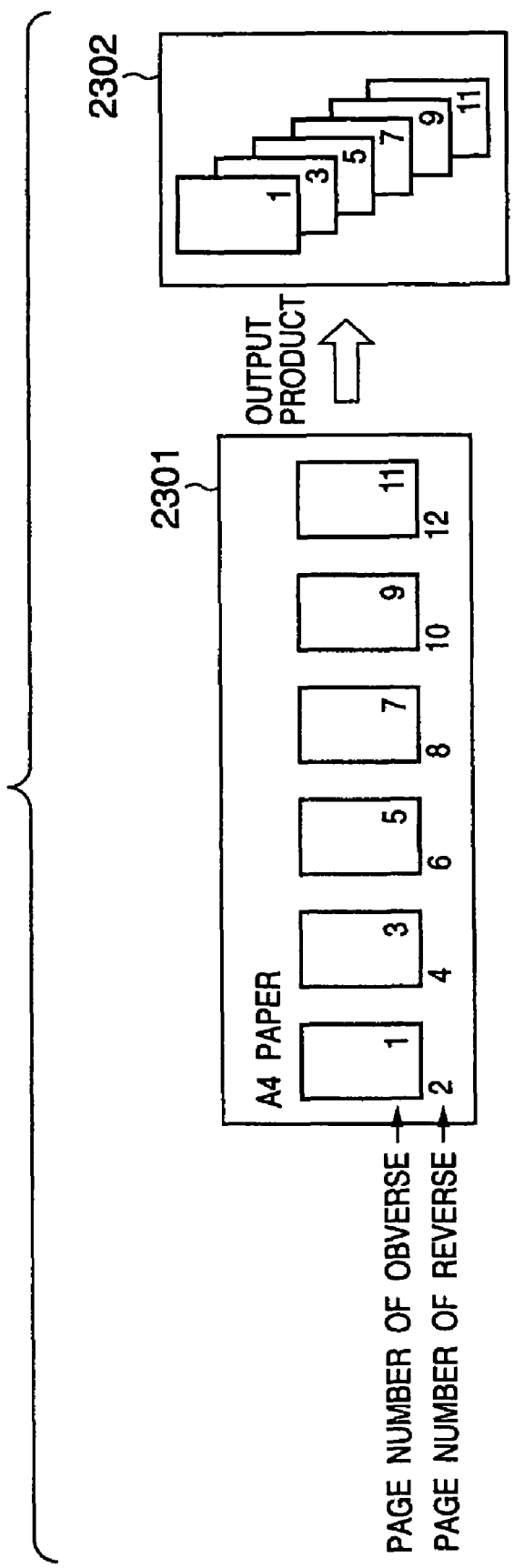
FIG. 23A is a view showing an example of substituting double face imposition and cutting for double face printing.

Before outputting a printed product, the image forming apparatus must change the printing image, which will be explained with reference to FIG. 23A. In order to obtain an output by A4 double face printing, an A4 image of one page is generally imposed on one face of an A4 paper sheet, and such A4 images are printed on the double faces. That is, a printing job 2301 (schematically shown in FIG. 23A) is transmitted to the image forming apparatus. In this case, the image forming apparatus outputs an output product 2302.

However, when the image forming apparatus runs out of A4 paper sheets and prints on A3 paper sheets, an A3 paper sheet is regarded as two successive A4 paper sheets, A4 images of two pages are imposed on one face of an A3 paper sheet, and such A4 images are printed on the double faces. The resultant A3 paper sheet is cut into two, obtaining outputs by A4 double face printing. To combine output products in two stacks after cutting into one stack, one stack is piled on the other. In this case, if pages are laid out so as to arrange paper sheets in the order of pages, output products need not be sorted. For this purpose, the image forming apparatus renders printing data again so as to rearrange pages and omit sorting, as shown in FIG. 23B. At this time, the image forming apparatus performs RIP (Raster Image Processing) again for A4 printing data corresponding to received data and job control information, and generates A3-size printing data corresponding to a printing job 2303. As an example of generating A3 printing data, the image forming apparatus generates, from PDL data for A4, intermediate data which sets the resolution, coordinate positions, and the like for A3. By expanding the A3 intermediate data, the image forming apparatus can generate A3 printing data (bitmap data). The image forming apparatus may paste A4 printing data of two planes having undergone RIP for A3, and print the data.

A printed product 2304 in FIG. 23B output from the image forming apparatus is set in the near-line finisher. The near-line finisher cuts an A3 paper sheet into A4 paper sheets in accordance with the job control information transmitted from the image forming apparatus. The printed product 2304 is cut into cut paper sheets 2305. A stack A of the cut paper sheets 2305 is piled on a stack B, obtaining an output product 2306 identical to the output product 2302.

More specifically, when a control unit 1901 detects that A4 paper sheets run out before or while a printing job containing designation of A4 double face printing is processed, it detects whether A3 paper sheets exist. If A3 paper sheets exist, the control unit 1901 searches the finisher profiles of available finishers for a profile which describes a function of cutting an A3-size paper sheet at the center. The description format is defined by JDF, and the control unit 1901 only determines whether the finisher profile contains a defined tag and attribute. If a corresponding profile is detected, the control unit 1901 generates (or changes) job control information to be transmitted to the finisher. The control unit 1901 describes, in the job control information, the setting of cutting an A3-size paper sheet at the center. The control unit 1901 changes the page layout of pages to be subsequently printed into a layout as represented by the job 2303 in FIG. 23B, and then prints the pages. More specifically, letting Ps (odd number) be a printing start page and Pe be the final page, a page (Ps+2i−2) is laid out on the left side of the obverse, and a page (((Pe−Ps+4)/4)*2+2i−1) is laid out on the right side. Note that "/" represents a calculation of obtaining the integer part of a quotient, and i is a number representing the order of an A3 paper sheet. For example, i=1 for the first paper sheet. On the reverse, a page (Ps+2i−1) is laid out on the right side (when the paper sheet is reversed), and a page (((Pe−Ps+4)/4)*2+2i) is laid out on the left side. If a page of a corresponding page number does not exist, a corresponding plane is left blank.

In the above manner, pages are rearranged and rendered, and output products are cut by the near-line finisher to implement A4 double face printing.

According to the second embodiment, when the image forming apparatus detects that a printing job cannot be achieved by a designated printing setting, it searches for a finisher having a post-processing function to be substituted for the printing setting, and generates post-processing setting information for the searched finisher. By this processing, an output result identical to that of an original printing job can be attained. For example, a printing job having the setting of A4 double face printing can be alternatively executed by A3 2in1 printing and post-cutting processing. Post-processing may also be executed by combining a plurality of near-line finishers. In the second embodiment, if a state in which a printing job cannot be achieved by a designated printing setting is detected, the paper type for use is changed to execute printing processing, and a printed result is processed using an available finisher. As a result, an output result identical to an expected output result can be obtained.

Third Embodiment

A case will be examined wherein, when A3 paper sheets are to be bound by saddle stitching to obtain an A4 booklet, the saddle stitch function of an image forming apparatus breaks down, and the processing path cannot be used. In a general image forming apparatus, if the function fails, a printing job stops and cannot be resumed until the function recovers. Alternatively, the printing job must be canceled, and another image forming apparatus must be instructed to perform printing again. However, an image forming apparatus having the profile of a near-line finisher can continue the printing job without stopping it. This method will be described in detail.

The method will be explained with reference to FIGS. 24A and 24B. In order to obtain an A4 booklet output 2402 shown in FIG. 24A, images of two A4 pages are imposed on one face of an A3 paper sheet, and such images are printed on the two faces of the A3 paper sheet, as represented by an image 2401. Note that a number represented by "page number of reverse" is a number when viewed from the obverse. That is, the 15th page is imposed on the back side of the 16th page. A product represented by the image 2401 must undergo saddle stitch processing by an in-line finisher.

When an in-line finisher connected to the image forming apparatus breaks down and cannot perform saddle stitch processing, all finisher profiles held in the image forming apparatus are searched for an alternative means. Even if a near-line finisher which does not have the saddle stitch function but has the folding, cutting, and bookbinding functions can be detected, a product identical to an expected final product which is bound and output can sometimes be obtained though the processing time may be prolonged and the processing cost may rise. In this case, the saddle stitch function of the in-line finisher is replaced with the folding, cutting, and bookbinding functions of the near-line finisher.

Figure 24B:
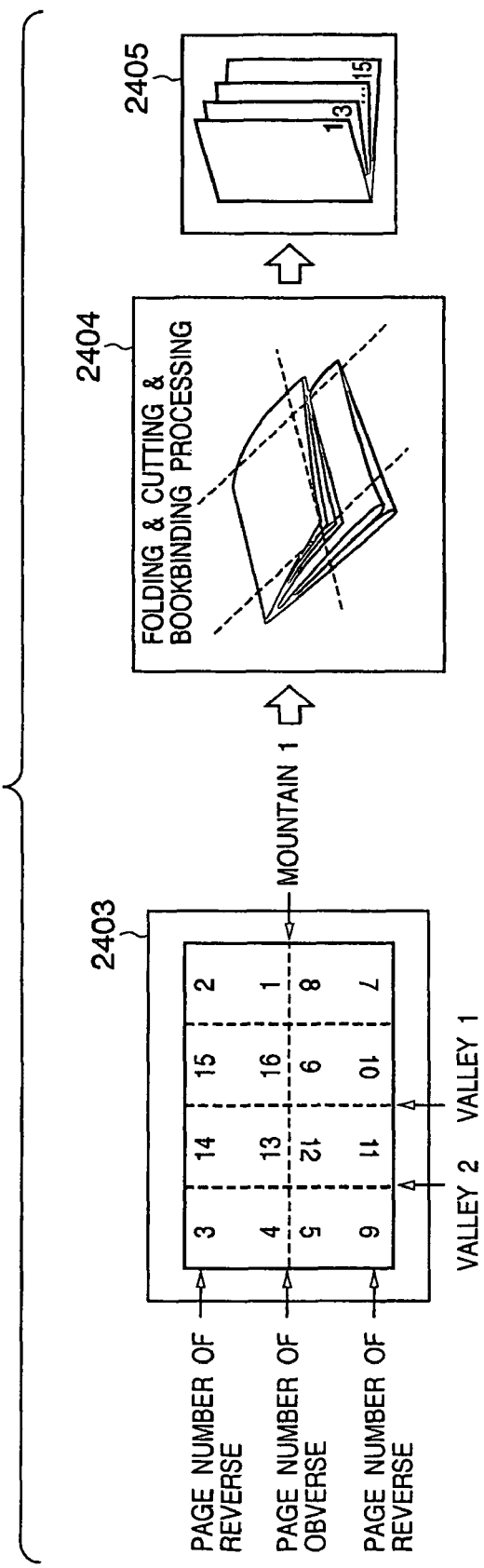
FIG. 24B is a view showing an example of substituting double face imposition, folding, cutting, and bookbinding for bookbinding printing.

Further, RIP is executed again so as to change an A3-size image as represented by the image 2401 into an image 2403 in FIG. 24B and impose A4-size pages on eight planes of an A1-size sheet. The direction of pages coincides with the order of page numbers. The resultant image is printed. After the image forming apparatus obtains an A1-size output product having undergone eight-plane imposition, the output product is set in the near-line finisher having the folding, cutting, and bookbinding functions, and processing can continue. As the folding order, valley fold is done at "valley 1"; mountain fold, at "mountain 1"; and valley fold, at "valley 2". Paper is folded from right to left and from bottom to top in FIG. 24B. As a matter of course, paper can be folded in several ways, and the imposition order changes depending on the folding method. Thus, reimposition is performed in accordance with a folding method represented by the folding function of the profile. The page layout of one A1-size sheet is stored in advance (e.g., the layout 2403 in FIG. 24B). After one A1-size sheet is processed, an offset value of 16 is added to each of page numbers to be laid out, and then pages are laid out. For example, for the second sheet, "16" is added to each of page numbers in the layout 2403.

Consequently, half-fold bookbinding printing can be alternatively achieved by 16-plane imposition, folding, cutting, and bookbinding.

As described above, when any error occurs in a given finisher and no finishing processing can be executed, another finisher alternatively provides the function of the abnormal finisher to continue processing without stopping the printing job. When the finisher is changed, the image forming apparatus can perform RIP again for printing data to change the output image, as needed.

Note that the second and third embodiments limit substitutable functions, but another function can be made substitutable. Such functions may be permanently determined by a program. Further, the image forming apparatus may save a table which makes substitutable functions and substituted functions (or combinations of them) correspond to each other, and an imposition method to be executed by the image forming apparatus after substitution. In this case, alternative functions can be more widely, flexibly implemented. It is also possible to alternatively execute post-processing by a combination of near-line finishers.

A method of specifying an alternative finisher when a near-line finisher is substituted for a target function will be exemplified. As ability information of a cutting apparatus serving as a near-line finisher, it is described that the cutting apparatus has a paper size change function. More specifically, it is described that Am-size (e.g., A3-size) paper is cut into An-size (e.g., A4-size) paper (the cutting function of B paper is also described, and the cutting function of an arbitrary size is also described, but these are irrespective of the embodiment). If no A4 paper exists, near-line finishers having functions associated with the paper size are searched for a cutting apparatus. If the cutting apparatus is detected, its ability information is checked to determine that A4 paper can be obtained by cutting A3 paper into two. Hence, if no A4 paper exists, a near-line finisher having the paper size change function is searched for, and an alternative function of cutting A3 paper into A4 paper is determined. This method is an example of specifying an alternative finisher.

The present invention may be applied to a system including a plurality of devices (e.g., a host computer, interface device, reader, and printer) or an apparatus including a single device (e.g., a copying machine or facsimile apparatus). The object of the present invention is achieved even by supplying a storage medium (or recording medium) which records software program codes to implement the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the program codes and the storage medium which stores the program codes constitute the present invention.

The functions of the above-described embodiments are implemented not only when the readout program codes are executed by the computer but also when the operating system (OS) or the like running on the computer performs part or all of actual processing on the basis of the instructions of the program codes. The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

<Effects of Present Invention Described in Embodiments>

According to the above-described embodiments and modifications, the printer driver can generate and transmit job control information for even a near-line finisher for use, similar to the printer. A finisher can be set without manually setting the finisher by the user. Thus, the productivity of the post-printing processing step can be increased, and any setting error can be prevented. The near-line finisher itself has profile information, and the client computer collects the profile information directly or via the printer. This can save the labor of inputting information on a newly connected near-line finisher.

Since job control information issued from the printer driver is transferred to a near-line finisher via the printer, the printer driver need neither particularly generate nor transmit job control information for the near-line finisher. Programming work of the printer driver can be simplified, which contributes to reduction of the code amount and a decrease in program errors.

When a plurality of finishers are available, a finisher designated on the basis of priority can be preferentially adopted. By changing the priority, the user can designate a finisher for use.

By preferentially using an in-line finisher, convey work of a printed product from a printing apparatus to a post-processing apparatus can be reduced, which contributes to savings in labor and an increase in productivity.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-128618 filed on Apr. 26, 2005, which is hereby incorporated by reference herein in its entirely.

What is claimed is:

1. An image forming apparatus having ability information of an available finisher, comprising:
   a detection unit which detects a stop state of post-processing by a first finisher;
   a search unit which, when said detection unit detects a stop of the first finisher, searches for a finisher that can alternatively perform processing to be executed by the first finisher based on the ability information;
   a generation unit which generates post-processing setting information for a second finisher found by said search unit; and
   a determination unit which, when said detection unit detects the stop of the first finisher, determines, by using the ability information, whether a printing job received by the image forming apparatus can be processed by combining a plurality of finishers,
   wherein when said determination unit determines that the printing job can be processed by combining a plurality of finishers, said generation unit generates the post-processing setting information for the plurality of finishers.

2. A method of controlling an image forming apparatus having ability information of an available finisher, comprising:
   a detection step of detecting a stop state of post-processing by a first finisher;
   a search step of, when a stop of the first finisher is detected in the detection step, searching for a finisher that can alternatively perform processing to be executed by the first finisher based on the ability information;
   a generation step of generating post-processing setting information for a second finisher found in the search step; and
   a determination step of, when the stop of the first finisher is detected in the detection step, determining, by using the ability information, whether a printing job received by the image forming apparatus can be processed by combining a plurality of finishers,
   wherein in the generation step, when the printing job is determined in the determination step to be processible by combining a plurality of finishers, the post-processing setting information is generated for the plurality of finishers.

* * * * *